United States Patent [19]
Bartholomew et al.

[11] Patent Number: 5,724,417
[45] Date of Patent: Mar. 3, 1998

[54] CALL FORWARDING TECHNIQUES USING SMART CARDS

[75] Inventors: Steven R. Bartholomew, Robbinsville; Stella Yuen-Chi Norteman, Scotch Plains, both of N.J.

[73] Assignee: Lucent Technologies Inc., Murray Hill, N.J.

[21] Appl. No.: 526,622

[22] Filed: Sep. 11, 1995

[51] Int. Cl.$^6$ .................................................. H04M 3/42
[52] U.S. Cl. ............................ 379/211; 379/67; 379/88; 379/89; 379/201; 379/357; 235/380; 455/73
[58] Field of Search ........................... 379/201, 207, 379/211, 212, 216, 357, 67, 88, 89; 340/825.49; 235/380; 455/73

[56] References Cited

U.S. PATENT DOCUMENTS

| | | | |
|---|---|---|---|
| 4,649,385 | 3/1987 | Aires et al. | 379/201 |
| 4,658,416 | 4/1987 | Tanaka | 379/57 |
| 4,680,785 | 7/1987 | Akiyama et al. | 379/57 |
| 4,752,951 | 6/1988 | Konneker | 379/211 |
| 4,759,056 | 7/1988 | Akiyama | 379/197 |
| 4,798,322 | 1/1989 | Bernstein et al. | 235/487 |
| 4,852,156 | 7/1989 | Shigenaga | 379/172 |
| 4,879,744 | 11/1989 | Tasaki et al. | 379/357 |
| 4,899,373 | 2/1990 | Lee et al. | 379/207 |
| 4,933,967 | 6/1990 | Lo et al. | 379/207 |
| 4,961,217 | 10/1990 | Akiyama | 379/89 |
| 4,977,619 | 12/1990 | Crimmins | 359/172 |
| 5,086,394 | 2/1992 | Shapira | 379/201 |
| 5,103,108 | 4/1992 | Crimmins | 2540/338.1 |
| 5,140,626 | 8/1992 | Ory et al. | 379/57 |
| 5,153,906 | 10/1992 | Akiyama et al. | 379/112 |
| 5,166,973 | 11/1992 | Hoff | 379/170 |

(List continued on next page.)

FOREIGN PATENT DOCUMENTS

| | | |
|---|---|---|
| 94308642 | 4/1995 | European Pat. Off. . |
| 54-114016 | 9/1979 | Japan . |

OTHER PUBLICATIONS

*EIA/TIA Project Number 2215, Cellular System –IS–54, Electronic Industries Association* "Dual–Mode Mobile Station–Base Station Compatibility Standard", Dec. 1989.

Primary Examiner—Krista Zele
Assistant Examiner—Scott Wolinsky
Attorney, Agent, or Firm—Steven R. Bartholomew

[57] ABSTRACT

Automatic call forwarding techniques for use in conjunction with a telephonic communications system such as a PBX or a central switching office. A telephonic device is associated with a smart card reader/writer and a communications unit RF transceiver. Subscribers are each provided with a smart card and an RF jacket transceiver adapted to partially and removably encase the smart card. In response to input received from the smart card reader/writer, the telephonic device instructs the communications system to forward incoming telephone calls for a given subscriber to the associated telephonic device. The communications unit RF transceiver periodically transmits an interrogation signal to the RF jacket transceiver. If the interrogation signal is received by the RF jacket transceiver, the RF jacket transceiver sends an acknowledgment signal to the communications unit RF transceiver, and incoming calls will continue to be forwarded to the associated telephonic device. However, if the interrogation signal is not received by the RF jacket transceiver, the RF jacket transceiver does not transmit an acknowledgment signal, the communications unit RF transceiver does not receive the acknowledgment signal, and the communications unit RF transceiver causes the associated telephonic device to instruct the communications system to no longer forward incoming calls to the associated telephonic device. In a further embodiment, if the interrogation signal is not received by the RF jacket, incoming calls continue to be forwarded to the associated telephonic device until a predetermined time interval elapses, whereupon incoming calls are no longer forwarded to this associated telephonic device.

8 Claims, 11 Drawing Sheets

U.S. PATENT DOCUMENTS

| | | | |
|---|---|---|---|
| 5,197,092 | 3/1993 | Bamburak | 379/59 |
| 5,208,849 | 5/1993 | Wong et al. | 379/70 |
| 5,309,511 | 5/1994 | Kotake | 379/211 |
| 5,311,570 | 5/1994 | Grimes et al. | 379/57 |
| 5,359,182 | 10/1994 | Schilling | 379/357 |
| 5,363,425 | 11/1994 | Mufti et al. | 379/211 |
| 5,366,978 | 11/1994 | Nagai | 455/90 |
| 5,402,469 | 3/1995 | Hopper et al. | 379/211 |
| 5,455,851 | 10/1995 | Chaco et al. | 379/38 |
| 5,479,496 | 12/1995 | Endo et al. | 379/211 |
| 5,515,426 | 5/1996 | Yacenda et al. | 379/201 |
| 5,541,983 | 7/1996 | Rose | 379/211 |
| 5,557,662 | 9/1996 | Kenmochi et al. | 379/357 |
| 5,557,665 | 9/1996 | Yamamoto | 379/357 |

CALL FORWARDING TECHNIQUES USING SMART CARDS

BACKGROUND OF THE INVENTION

1. Field of the Invention

This invention relates generally to telephonic communications systems, and more specifically to call forwarding techniques.

2. Background

Various techniques have been developed for automatically forwarding incoming telephone calls directed to a called party.

One such technique, disclosed in Japanese Patent No. 54(1979)-161807 issued to Tsukada, provides each telephone subscriber with a portable transmitter. Each transmitter sends out a signal modulated with a unique code, and/or each signal is transmitted on a specific pre-assigned frequency. Each telephone is equipped with an RF receiver that responds to a signal generated by any of the portable transmitters. When a telephone subscriber approaches the vicinity of one of the telephones, the signal generated by the portable transmitter is received by the telephone RF receiver. The telephone then communicates with a central switching office to cause all incoming calls for that subscriber to be redirected to that telephone.

A significant drawback of this call redirecting technique is that telephone subscribers do not decide when, or if, incoming calls should be redirected. Similarly, telephone subscribers do not decide which of a plurality of remotely-situated telephones will be used to receive redirected calls. Rather, this determination is effectively based upon the relative strength of the RF communication links between the portable transmitter and each of the various telephone RF receivers in the vicinity of the portable transmitter. As a result, this system is not practical for many real-world applications.

In a crowded urban area, a pedestrian carrying a portable transmitter may pass within close proximity to a telephone RF receiver in a nearby business establishment. All of the subscriber's telephone calls would be forwarded to that establishment, without the subscriber assenting to such a call forwarding arrangement, and without the subscriber even being aware of this arrangement. Incoming callers will be baffled when unable to reach the subscriber, and valuable business contacts may be lost.

Although it is possible to provide a switch on the transmitter, enabling the subscriber to decide whether or not call forwarding is to be activated, this arrangement presents disadvantages. If several telephone RF receivers are in the vicinity of the subscriber, upon switching the transmitter on, the subscriber is unable to specify which of the telephone RF receivers is to receive forwarded calls. The subscriber may intend to forward calls to a telephone twenty feet away and in plain view, unaware that the transmitter's signal has been received by the telephone RF receiver of another telephone that is only inches away from the subscriber, but out of view on the other side of a wall. Therefore, it would be desirable to have a call forwarding system that only forwards calls to a specific telephone in response to a conscious, affirmative, well-defined act performed by the subscriber.

Another automatic call forwarding technique, described in U.S. Pat. No. 5,311,570, issued to Grimes et al. and entitled, "Integration of Wireless Paging in a Communication System", operates in conjunction with a communications system such as a PBX or a central switching office. Each system user is provided with a portable pager and a two-way voice communications device associated with the pager. Upon receipt of an incoming call, the communications system signals both the pager and the associated voice communications device. If the called party is not in the vicinity of the associated voice communications device, but is near another two-way voice communications device connected to the communications system, a call forwarding operation is performed. In this context, it is assumed that the called party is not in the vicinity of the associated voice communications device if the called party does not answer the call on the associated voice communications device. The paging device transmits a signal to the communication system which causes the incoming call to be forwarded to the two-way voice communications device near the called party.

When a call is forwarded using the system described in the Grimes patent, the calling party is provided with a voice message stating that the called party intends to answer the call. Therefore, the calling party is inconvenienced by having to wait while the called party locates a telephone set that can be used to answer the call. If there are a number of telephones in the vicinity of the called party, the system described in Grimes provides no mechanism by which the called party can specify the telephone set on which it is desired to answer the call. Moreover, the entire call forwarding procedure must be repeated every time a new incoming call is received, irrespective of whether or not the called party has moved to a new location during the time interval between consecutive incoming calls. Since the communications system notifies both the pager and the associated communications device of the existence of an incoming call, the use of an automatic answering machine at the associated communications device may prevent incoming calls from being forwarded. Consequently, the Grimes system is not compatible with most presently-existing telephone answering equipment.

What is needed is an improved automatic call forwarding system that forwards calls to a remote telephonic device specifically designated by the called party. Transparent call forwarding should be provided, such that the calling party is not aware that a telephone call is being forwarded. Similarly, the calling party should not be kept waiting while the called party locates a suitable telephone on which to accept the forwarded call. The called party should be able to activate and deactivate the call forwarding system as desired. Therefore, call forwarding should be based upon user selection, and not be determined anew each time an incoming call is received.

SUMMARY OF THE INVENTION

Automatic call forwarding techniques are provided for use in conjunction with a telephonic communications system such as a PBX or a central switching office. A remote telephonic device is associated with a smart card reader/writer and a communications unit RF transceiver. Subscribers are each provided with a smart card adapted to store a subscriber telephone number and an RF jacket transceiver adapted to partially and removably encase the smart card. However, an RF jacket is not required if an RF transceiver is integrated into the smart card. In response to input received from the smart card reader/writer, the remote telephonic device instructs the communications system to forward incoming telephone calls for the subscriber telephone number to the remote telephonic device associated with this smart card reader/writer. The communications unit RF transceiver periodically transmits an interrogation signal to the RF jacket transceiver. If the interrogation signal is received by the RF jacket transceiver, the RF jacket transceiver transmits an acknowledgment signal and, if this acknowledgment signal is received by the communications unit RF transceiver, incoming calls will continue to be forwarded to the associated telephonic device. However, if the communications unit RF transceiver, in response to transmitting an interrogation signal, does not receive an acknowledgment signal, the communications unit RF transceiver causes the associated telephonic device to instruct the communications system that the subscriber is no longer in physical proximity with the associated telephonic device. In response to this instruction, the communications system may direct subsequent incoming telephone calls to an alternate switching destination such as another remote telephonic device, the home telephonic device, or a voice mail system. In an alternate embodiment, incoming calls are forwarded only if the communications unit RF transceiver, in response to transmitting an interrogation signal, does not receive an acknowledgment signal.

In a further embodiment, if the communications unit RF transceiver does not receive an acknowledgment signal in response to transmitting an interrogation signal, incoming calls continue to be forwarded to the associated telephonic device until a predetermined time interval elapses, whereupon incoming calls are no longer forwarded to the associated telephonic device. In a further alternate embodiment, if the communications unit RF transceiver, in response to transmitting an interrogation signal, does not receive an acknowledgment signal, incoming telephone calls cease to be forwarded to the associated telephonic device. However, after failing to receive an acknowledgment signal in response to an interrogation signal, the communications unit RF transceiver continues to transmit interrogation signals for a specified time interval. During this time interval, if the communications unit RF transceiver receives an acknowledgment signal in response to an interrogation signal, incoming calls continue to be forwarded to the associated telephonic device.

DETAILED DESCRIPTION OF THE PREFERRED EMBODIMENTS

Figure 1:
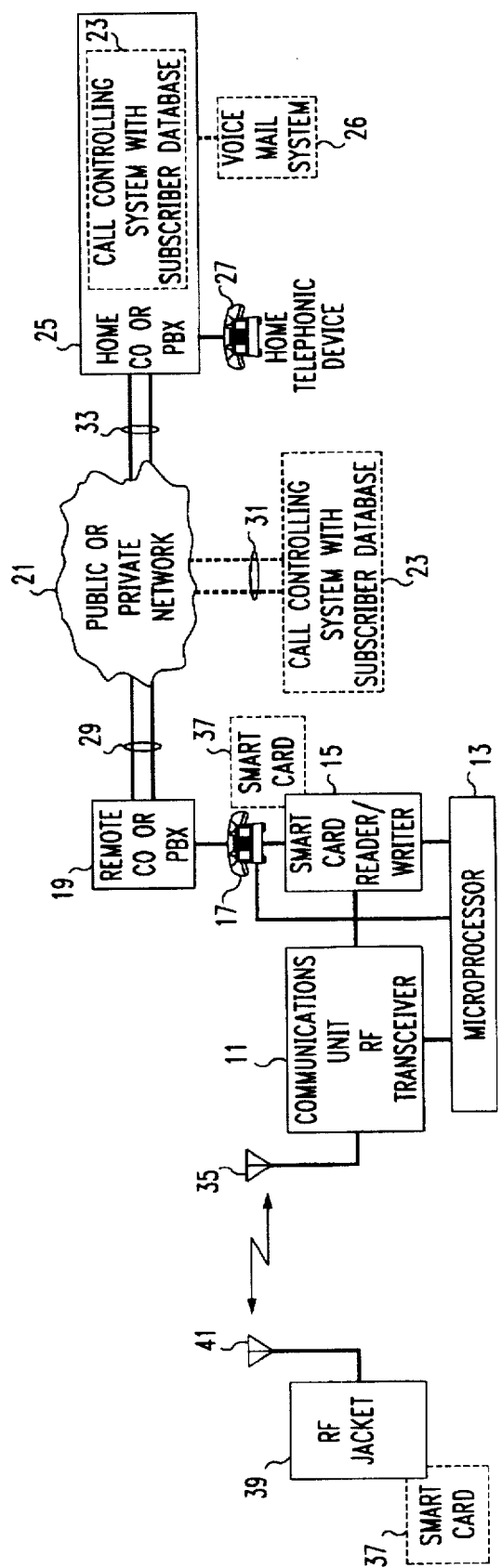
FIG. 1 is a hardware block diagram of an automatic call forwarding system disclosed herein.

FIG. 1 is a hardware block diagram of an automatic call forwarding system constructed according to an embodiment disclosed herein. A remote telephonic device 17 is coupled to a smart card reader/writer 15. Remote telephonic device 17 may include, for example, a plain old telephone set (POTS), a telephone set equipped to implement touch-tone dial signaling, a telephone answering machine, a telephone key system set, a fax machine, video conferencing equipment, a modem, or any of other various types of telephonic equipment.

Smart card reader/writer 15 is a generally-known component of conventional design. Examples of suitable smart card reader/writers are disclosed in U.S. Pat. Nos. 4,798,322, 5,120,939, and 5,310,999, the disclosures of which are hereby incorporated by reference. In general, these smart card reader/writers 15 perform data transfer operations on a smart card 37 that has been removably inserted into smart card reader/writer 15, and/or on a smart card 37 that is held in close proximity to smart card reader/writer 15. Smart card reader/writer 15 is equipped to upload data stored on smart card 37, and to download data to smart card 37. These downloading and uploading operations are performed over a short-range electromagnetic communications link between the smart card 37 and the smart card reader/writer 15. The short-range electromagnetic communications link may utilize near-field coupling, such as capacitive coupling, inductive coupling, and/or resonant coupling, to provide for the transfer of radio frequency signals to and from smart card 37.

The generally-accepted definition of the term "smart card" applies to smart card 37. Pursuant to this definition, smart card 37 is a substantially credit-card-sized device that includes an on-board microprocessor, a memory coupled to the microprocessor, a transducing device, and transceiver circuitry coupled to the transducing device and to the microprocessor. The transducing device includes metallic circuit board traces having capacitive and/or inductive reactance, so as to provide the aforementioned short-range electromagnetic communications link between smart card 37 and smart card reader/writer 15. This short-range link typically operates over a distance of less than an inch. Beyond a distance of about several inches, the short-range link is no longer effective for data communications.

In order to provide smart card 37 with wireless data communication capabilities spanning moderate distances of, say, several inches to several hundred feet, an RF jacket 39 is employed. RF jacket 39 enables smart card 37 to engage in wireless two-way data communications with remotely-situated devices, such as communications unit RF transceiver 11. Typically, the electromagnetic signals sent from smart card 37 are at a relatively low RF frequency and a relatively low RF power level. Although these operating parameters are sufficient to provide adequate near-field coupling to smart card reader/writer 15, greater RF power levels and/or higher RF frequencies are required for signal propagation over distances on the order of tens or hundreds of feet.

In operation, RF jacket 39 is held in close proximity to, and/or partially but removably encases, smart card 37, so as to enable data communications between RF jacket 39 and the smart card transducing device. RF jacket 39 includes smart card coupling circuitry and an RF transceiver. In addition to conventional transmit and receive circuitry, the RF transceiver may include RF power amplification circuitry and optional frequency conversion circuitry. The coupling circuitry provides a short-range electromagnetic communications link to the smart card 37 transducing device. The amplification circuitry amplifies the signals received from the coupling circuitry to provide an RF signal of sufficient power to radiate over a desired coverage area, such as, for purposes of illustration, an area in the range of about several feet to several hundred feet. The optional frequency conversion circuitry converts the frequency of the electromagnetic signals sent from the smart card 37 to the RF jacket 39, and also converts the frequency of electromagnetic signals received by RF jacket 39 before these signals are sent to smart card 37. The electromagnetic signals received by RF jacket 39 from smart card 37 are converted to a desired RF output frequency which may be selected based upon desirable coverage properties, enhanced noise immunity, and/or FCC rules and regulations. The optional frequency conversion circuitry also converts incoming RF signals received by the RF jacket 39 and having a predetermined receive frequency into signals having a frequency that is readable by smart card 37. Each smart card RF jacket 39 may optionally be assigned a predetermined transmitting frequency and/or a predetermined receiving frequency within a given band of frequencies. Alternatively, each smart card RF jacket 39 may optionally be equipped to operate on any of a plurality of frequencies within a given frequency band, and assigned a predetermined digital code for identifying the smart card RF jacket. RF jacket 39 is coupled to an antenna 41, which may be either internal or external to the RF jacket.

Smart card reader/writer 15 is coupled to a communications unit RF transceiver 11. However, note that smart card reader/writer 15 may be integrated with communications unit RF transceiver 11 into a single-unit device. In the present example, communications unit RF transceiver 11 is equipped with a data modulation circuit that accepts an input signal from the smart card reader/writer 15 and uses this input signal to modulate a radio frequency (RF) carrier. Communications unit RF transceiver 11 may generate an RF carrier signal in any convenient frequency band, subject to existing Federal Communications Commission (FCC) rules and regulations. For example, one or more frequencies in the range of 800–1000 mHz may be employed for this purpose. An antenna 35 is coupled to communications unit RF transceiver 11.

The communications unit RF transceiver 11 includes a receiver that is adapted to demodulate an incoming RF signal transmitted by RF jacket 39. The demodulated signal includes data that has previously been downloaded from the smart card and used to modulate the RF signal generated by the RF jacket 39 transceiver. For some system applications, each communications unit RF transceiver 11 may be assigned a predetermined transmit frequency within a given frequency band and/or a predetermined receive frequency within a given frequency band. However, in the present example, each communications unit RF transceiver 11 is adapted to receive signals on any of a plurality of frequencies within a given frequency band, and also to transmit signals on any of a plurality of frequencies within this given frequency band. Based upon the frequency of a signal received by the communications unit RF transceiver 11, the transceiver selects an appropriate transmit frequency for responding to the received signal.

Ideally, the RF power output level of RF transceiver 11 should provide no less than a predetermined minimum field strength level throughout a desired coverage area. However, it is not necessary to meet this ideal and, in practice, significant departures from this ideal may exist. In the present context, the desired coverage area is defined as the area within which it is desired to forward appropriate incoming calls to remote telephonic device 17. Since the maximum permissible power output level of RF transceiver 11 is limited by FCC rules and regulations, under some circumstances, use of the maximum allowable power is insufficient to cover a desired area. A practical factor limiting RF power output levels is that transceivers equipped to generate relatively high power levels are relatively expensive and bulky. Moreover, the RF propagational properties of the environment in which remote telephonic device 17 will be used are generally not known with any degree of certainty. In some environments, it may not be possible to cover the entirety of a desired area with an RF signal of sufficient field strength, while at the same time conforming to existing FCC rules and regulations. Therefore, the selection of an appropriate RF power output level is based upon the specific characteristics of a given system application, and typically may be on the order of tens or hundreds of milliwatts.

The operation of communications unit RF transceiver 11 and smart card reader/writer 15 are controlled by a microprocessor 13. Although the example of FIG. 1 shows microprocessor 13 as a discrete hardware component, it is possible to integrate microprocessor 13 into smart card reader/writer 15 and/or communications unit RF transceiver 11. Microprocessor 13 is programmed to coordinate transmit and receive operations performed by communications unit RF transceiver 11, to coordinate read and write operations performed by smart card reader/writer 15, and to coordinate operations performed by communications unit RF transceiver 11 with operations performed by smart card reader/writer 15. Microprocessor 13 is equipped to communicate with a smart card 37 microprocessor via a link including communications unit RF transceiver 11, antenna 35, antenna 41, and RF jacket 39. Microprocessor 13 is also equipped to communicate with remotely-situated processors via a link including smart card reader/writer 15, remote telephonic device 17, remote central office (CO) or PBX 19, and public or private network 21.

A central switching office (CO), a private branch exchange (PBX), a switch in a private communications network, and/or a switch in a public communications network, may be employed to implement remote CO or PBX 19. The remote CO or PBX 19 is coupled to a public or private network 21 via a communications link 29. Public or private network 21 may be implemented using a PSTN (public switched telephone network) and/or a PBX network and/or a wireless network. A home CO (central office) or PBX (private branch exchange) 25 is coupled to public or private network 21 via communications link 33. Alternatively, remote CO or PBX 19 can be part of public or private network 21. Similarly, home CO or PBX 25 can be part of public or private network 21. Furthermore, home CO or PBX 25 and remote CO or PBX 19 can be implemented using the same switch. Conventional hardware and software elements known to those skilled in the art may be employed to fabricate such PBXs, COs, PSTNs and/or PBX networks.

A home telephonic device 27 is coupled to home CO or PBX 25. Home telephonic device 27 may include, for example, a plain old telephone set (POTS), a telephone set equipped to implement touch-tone dial signaling, a telephone answering machine, a telephone key system set, a fax machine, video conferencing equipment, a modem, or any of other various types of telephonic equipment. Home CO or PBX 25 may be coupled to an optional voice mail system 26. The selection of a suitable system for voice mail system 26 is a matter within the knowledge of those skilled in the art, and any of a number of existing voice mail systems may be employed.

In the absence of call forwarding arrangements, incoming calls arriving at public or private network 21 are directed to home CO or PBX 25. Therefore, home CO or PBX 25 may be conceptualized as representing a default switching destination for an incoming telephone call, and remote CO or PBX 19 may be conceptualized as representing an alternate switching destination. Pursuant to the techniques described hereinafter, incoming telephone calls may be selectively redirected (forwarded) from the home CO or PBX 25 to a remote CO or PBX 19. Incoming telephone calls may also be selectively redirected (forwarded) from the remote CO or PBX 19 back to the home CO or PBX 25.

Selective forwarding of incoming telephone calls is controlled by a call controlling system with subscriber database 23. The call controlling system with subscriber database 23 is implemented using a microprocessor coupled to a data storage device. Although the system of FIG. 1 shows the call controlling system with subscriber database 23 as a discrete element, this is for illustrative purposes only. The call controlling system with subscriber database 23 may be implemented using a microprocessor and data storage drives that are integrated into another system component, such as the public or private network 21, or the home CO or PBX 25. In the case where call controlling system with subscriber database 23 is to be integrated with another system component, it is not necessary to modify or add to the existing hardware. Existing system components are merely equipped with enhanced software to provide the functionality necessary to implement call controlling system with subscriber database 23. For example, the call controlling system with subscriber database 23 may be a software system that controls call forwarding and resides on the home CO or PBX 25. Note that this home CO or PBX 25 may, in fact, be implemented using a central office switch, a PBX, and/or a switch in public or private network 21.

Alternatively, the call controlling system with subscriber database 23 can reside on one of the following systems: (1) a dedicated computer with separate hardware that interfaces to the home CO or PBX 25; (2) a computer that is equipped to perform voice processing operations, text processing operations and/or multimedia operations, and interfaces to the home CO or PBX 25; (3) public or private communications network software; (4) microprocessor 13 of FIG. 1.

Figure 8:
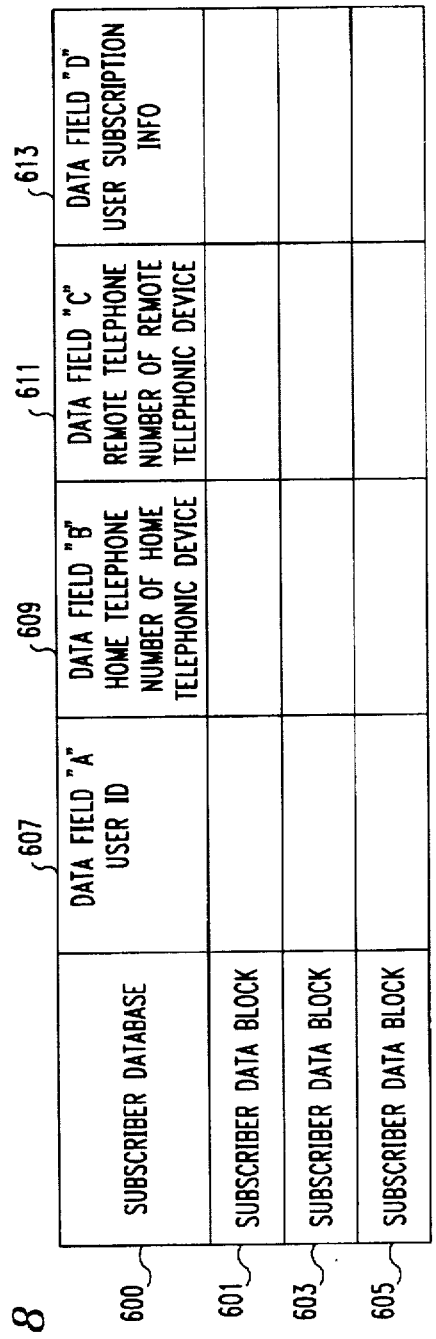
FIG. 8 is a data structure diagram specifying the manner in which data are organized on a call controlling system with subscriber database.

As an optional feature to provide additional system reliability and accountability, call controlling system with subscriber database 23 may be equipped to perform periodic audits of subscriber database 600 (FIG. 8). With each audit, call controlling system with subscriber database 23 keeps a time stamp for each subscriber. If call forwarding of a given subscriber's incoming telephone calls to a given remote telephonic device 17 has been activated for a period of time greater than that specified by, for example, a system administrator, then the call controlling system with subscriber database 23 sends a query signal to microprocessor 13. This query signal includes the user ID corresponding to the subscriber at remote telephonic device 17.

The microprocessor 13 responds to this query signal by instructing the communications unit RF transceiver 11 to check for the presence of the subscriber's RF jacket 39 by transmitting an interrogation signal. If the subscriber's RF jacket responds to this interrogation signal by transmitting an acknowledgment signal, and if this acknowledgment signal is received by the communications unit RF transceiver 11, then the microprocessor 13 sends a confirmation signal back to call controlling system with subscriber database 23. The call controlling system with subscriber database 23 continues to forward this subscriber's calls to remote telephonic device 17, and continues auditing other subscribers, if any such subscribers exist. If the RF jacket 39 corresponding to the above-referenced subscriber is not detected at remote telephonic device 17, (i.e., if communications unit RF transceiver receives no acknowledgment signal in response to transmitting an interrogation signal), then the microprocessor 13 sends a non-confirmation signal back to the call controlling system with subscriber database 23. The call controlling system with subscriber database 23 then terminates call forwarding to the remote telephonic device 17. In this manner, audits may be performed at regular or convenient intervals, such as once a day at a specified time. If a subscriber's calls have been forwarded to a remote telephonic device 17 for a period of time exceeding, for example, three days, the communications unit RF transceiver 11 checks to see whether this subscriber's RF jacket 39 is still in the vicinity of remote telephonic device 17 before continuing call forwarding to remote telephonic device 17.

The operations to be performed by call controlling system with subscriber database 23 are set forth in greater detail below, with reference to FIGS. 2–6. FIGS. 2–6 together comprise a software flowchart setting forth the sequence of operations to be performed by the hardware configuration of FIG. 1. The program commences at block 221, where a smart card 37 that has been placed into the smart card reader/writer 15 (FIG. 1) is read. A smart card 37 and an associated RF jacket 39 are assigned to a specific system user that uses a corresponding home telephonic device 27. If this user is located near remote telephonic device 17 and desires to have incoming calls redirected from home telephonic device 27 to remote telephonic device 17, the user removes smart card 37 from RF jacket 39 and places smart card 37 into the smart card reader/writer 15 to initiate the telephone call redirection procedure. However, note that the RF jacket 39 could, alternatively, be configured so as to permit smart card reader/writer 15 to perform read/write operations on smart card 37 while the smart card 37 is encased in RF jacket 39.

Figure 2:
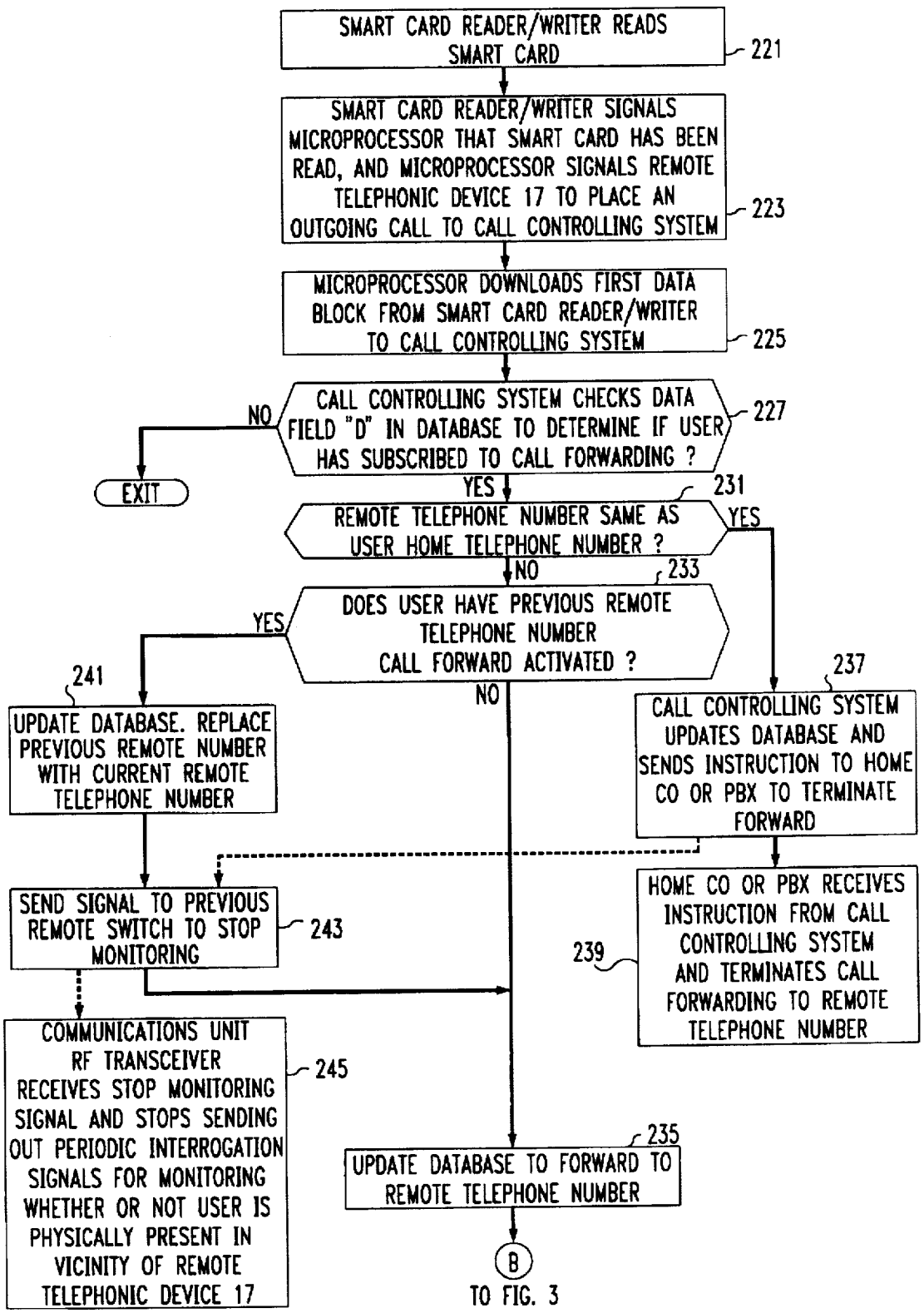
FIGS. 2, 3, 4, 5, and 6 together comprise a software flowchart setting forth an operational sequence to be performed in conjunction with the system of FIG. 1.

At block 223, the smart card reader/writer 15 signals microprocessor 13 that a smart card has been read, and microprocessor signals remote telephonic device 17 to place an outgoing call to call controlling system with subscriber database 23 via public or private network 21 and remote CO or PBX 19. When the outgoing call is answered by the call controlling system with subscriber database 23 (hereinafter, call controlling system 23), the microprocessor 13 downloads a first data block 501 (FIG. 7) from the smart card reader/writer 15 to the call controlling system 23 (FIG. 2, block 225). This first data block 501 (FIG. 7) includes a first data field 503 uniquely identifying the user (i.e., specifying a user ID), a second data field 505 specifying the home telephone number of the home telephonic device 27 (FIG. 1), a third data field 507 (FIG. 7) specifying the telephone number of the remote telephonic device 17 (FIG. 1), and a fourth data field 509 (FIG. 7) setting forth user subscription information specifying, for example, whether or not the user has subscribed to the call redirection feature described herein. However, before microprocessor 13 downloads data block 501 to call controlling system 23, microprocessor 13 writes the remote telephone number corresponding to remote telephonic device 17 into the third data field 507 of the first data block 501. Microprocessor 13 also writes the remote telephone number corresponding to remote telephonic device 17 into the third data field 507 of smart card 37 via smart card reader/writer 15, while smart card 37 is coupled to smart card reader/writer 15.

Figure 7:
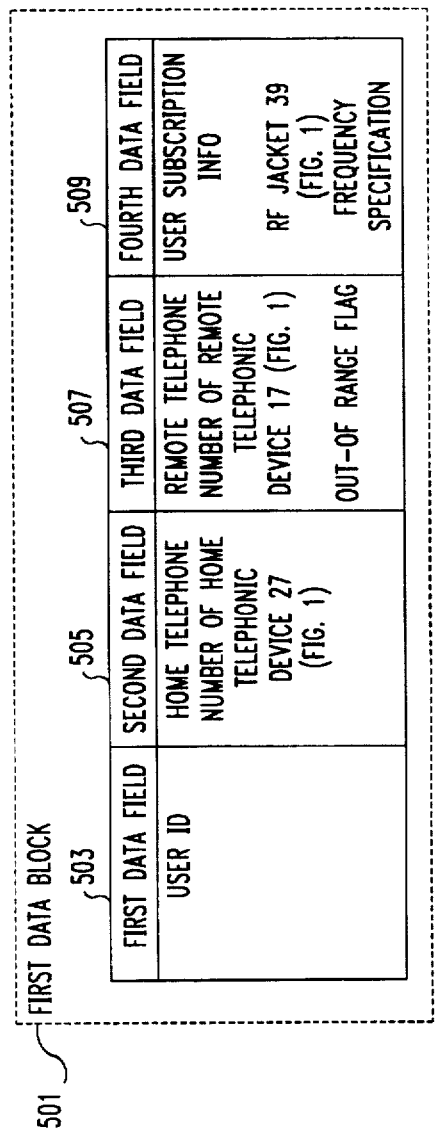
FIG. 7 is a data structure diagram specifying the manner in which data are organized on a smart card.

At block 227 (FIG. 2), after receiving the data from the microprocessor 13, the call controlling system 23 checks data field "D" 613 (FIG. 8) corresponding to the specified user ID to determine whether or not the user has subscribed to the call redirection feature. If not, the program exits. If so, the program progresses to block 23 1 (FIG. 2) where the call controlling system performs a test to ascertain whether or not the home telephone number stored in data field "B" 609 (FIG. 8) is identical to the remote telephone number stored in third data field 507 (FIG. 7). If so, the program progresses to block 237 (FIG. 2), where the call controlling system 23 updates the subscriber database 600 (FIG. 8) by removing the remote telephone number and changing a call forwarding status flag in data field "D" 613 (FIG. 8) to a value indicative that no call forwarding is to take place, i.e., that call forwarding has been terminated. The "call forwarding status" flag can be implemented using a single bit, such that a first bit value, i.e., "1", indicates that the flag is set and call forwarding is to take place, and such that a second bit value, i.e., "0", indicates that the flag is not set and no call forwarding will take place. At block 237, the call controlling system 23 also sends a call forwarding termination signal to home CO or PBX 25 instructing the home CO or PBX to terminate call forwarding for the telephone number corresponding to home telephonic device 27. This call forwarding termination signal includes the user ID and the subscriber home telephone number. In response to the instruction received from the call controlling system 23, the home CO or PBX 25 terminates call forwarding to the remote telephone number corresponding to remote telephonic device 17, and subsequent incoming calls are directed to the home telephone number corresponding to home telephonic device 27 (block 239). At block 243, call controlling system 23 sends a "termination of monitoring" flag to communications unit RF transceiver 11, instructing the communications unit RF transceiver 11 associated with remote telephonic device 17 to no longer monitor RF jacket 39 (i.e., to no longer transmit interrogation signals to the RF jacket). The "termination of monitoring" flag can be implemented using a single bit, such that a first bit value, i.e., "1", indicates that the flag is set and monitoring is to terminate, and such that a second bit value, i.e., "0", indicates that the flag is not set and monitoring may continue.

The negative branch from block 231 leads to block 233, where a test is performed to ascertain whether or not any telephone call forwarding is already being performed with respect to incoming calls directed to home telephonic device 27. In other words, has the user previously activated telephone call forwarding, and is this previous call redirection still active? This test can be performed by comparing the smart card third data field 507 (FIG. 7) with data field "C" 611 (FIG. 8) in the subscriber database 600 (FIG. 8) of call controlling system 23 (FIG. 1). If the contents of the third data field 507 are different from the contents of data field "C" 611, then the user has previously activated call forwarding. The affirmative branch from block 233 leads to block 241, where the subscriber database in call controlling system 23 is updated by replacing the previous remote telephone number in data field "C" 611 (FIG. 8) with the current remote telephone number from third data field 507 (FIG. 7). At block 243, a "stop monitoring" signal is sent to remote CO or PBX 19 that corresponds to the previous remote telephone number in data field "C" 611 (FIG. 8). The "stop monitoring" signal includes the user ID, the previous remote telephone number, and a "termination of monitoring" flag specifying termination of monitoring at the previous remote telephone number. This "stop monitoring" instruction is sent to communications unit RF transceiver 11 via remote telephonic device 17 and microprocessor 13 (block 245). The "stop monitoring" signal commands the communications unit RF transceiver 11 to stop transmitting periodic interrogation signals. These signals are sent out to monitor whether or not the user is physically present in the vicinity of remote telephonic device, as will be described in greater detail below with reference to FIG. 3, block 337.

After sending the "stop monitoring" signal to the previous remote switch at block 243, the call controlling system 23 proceeds to block 235. The dashed program flow line from block 243 to block 245 signifies that the operations of block 245 are performed concurrently with, immediately prior to, or immediately after, the operations of block 235 are performed.

The negative branch from block 233, signifying that no call forwarding is currently activated for the user, leads to block 235. At block 235, the subscriber database stored in call controlling system 23 is updated when microprocessor 13 downloads the remote telephone number from the third data field 507 (FIG. 7) into the subscriber database data field "C" 611 (FIG. 8) via remote telephonic device 17, remote CO or PBX 19, and public or private network 21. The "call forwarding status" flag in data field "D" 613 (FIG. 8) is also set to a value indicating that call forwarding is to take place.

Figure 3:
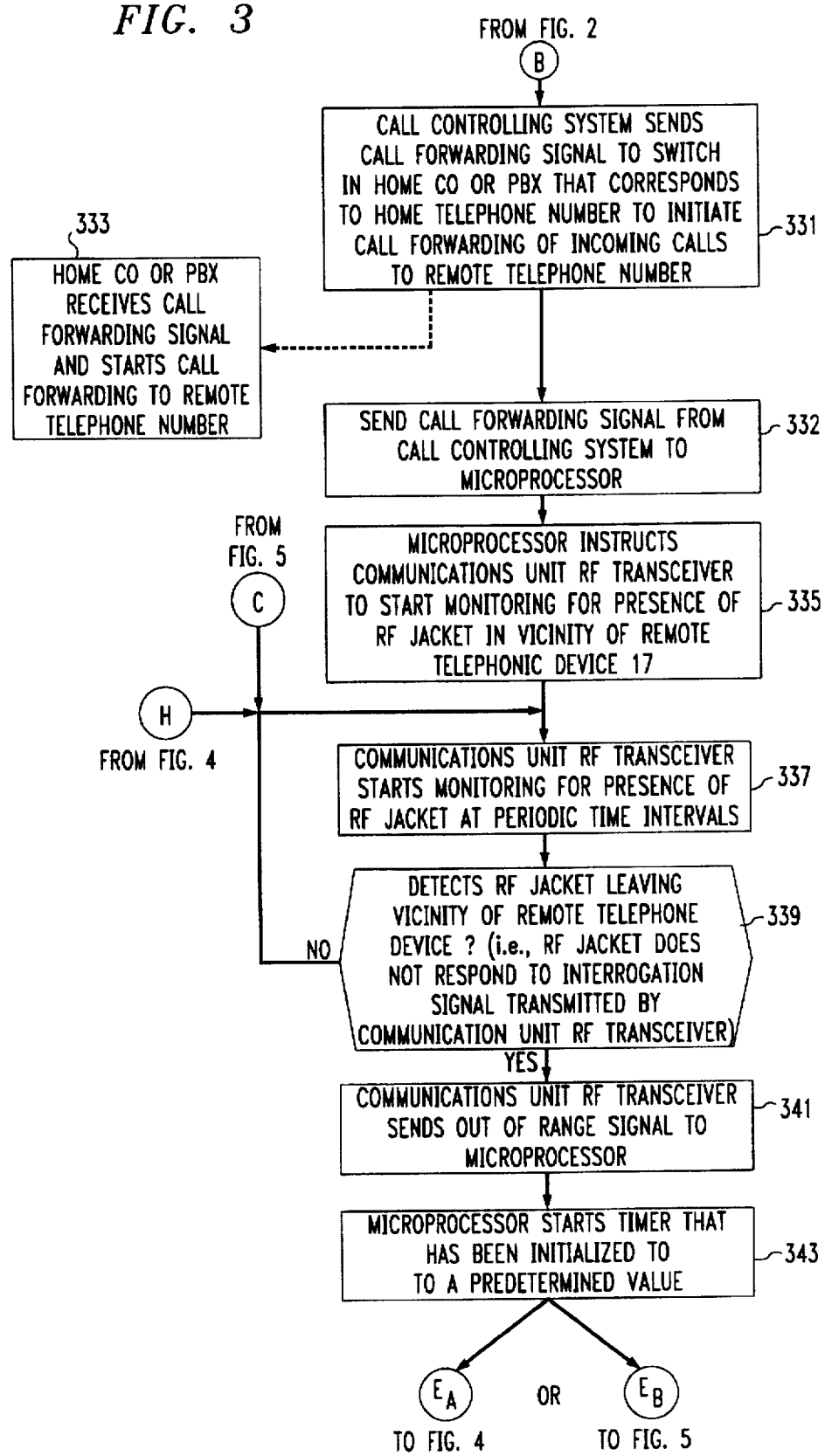

Program control then progresses to block 331 of FIG. 3, where a call forwarding signal is sent to the switch in home CO or PBX 25 that corresponds to the user's home telephone number. This call forwarding signal includes the user ID, the home telephone number, and the remote telephone number. The call forwarding signal instructs a switch in the home CO or PBX 25 (FIG. 1) to initiate forwarding of any incoming telephone calls for the home telephone number to the remote telephone number. At block 333, the home CO or PBX 25 receives the call forwarding signal and starts to forward incoming calls to the remote telephone number. The dotted program flow line running from block 331 to block 333 signifies that the operations of block 333 are performed concurrently with the sequence of operations beginning at block 332.

Call controlling system 23 sends a "start monitoring" signal to microprocessor 13 at the new remote CO or PBX 19 to start monitoring the RF jacket 39 at block 332. The "start monitoring" signal includes the user ID, the remote telephone number, an optional range of monitoring parameter, and an optional timer parameter. The functions of the timer parameter and the range of monitoring parameter will be described in greater detail hereinafter. This "start monitoring" instruction is sent to communications unit RF transceiver 11 via remote telephonic device 17 and microprocessor 13 (block 335). The "start monitoring" signal commands the communications unit RF transceiver 11 to start transmitting periodic interrogation signals. These signals are sent out to monitor whether or not the user is physically present in the vicinity of remote telephonic device 17.

To summarize the operations of block 335, the microprocessor 13 (FIG. 1) instructs the communications unit RF transceiver 11 to start monitoring for the presence of the RF jacket 39 in the vicinity of remote telephonic device 17. During typical system operation, it is generally expected that the user will retain RF jacket 39 and smart card 37 on his or her person, with the smart card 37 inserted into the RF jacket 39. Therefore, monitoring for the presence of the RF jacket 39 is conducted for the purpose of ascertaining whether or not the user has left the vicinity of remote telephonic device 17 and, therefore, whether incoming telephone calls for this user should still be forwarded to this remote telephonic device 17. If the user has left the vicinity of the remote telephonic device for more than a specified amount of time, it is assumed that calls for this user are no longer to be forwarded to remote telephone device 17. By contrast, if the user remains in the vicinity of remote telephonic device 17, it is assumed that incoming calls directed to the user's home telephone number should continue to be forwarded to remote telephonic device 17. The length of this specified amount of time may be ascertained by assigning an appropriate value to the optional timer parameter discussed above. The "range of monitoring" parameter is optionally used to set (a) the RF power output level of communications unit RF transceiver 11, and/or (b) the minimum received signal strength that communications unit RF transceiver 11 will use to accept an incoming acknowledgment signal sent by an RF jacket 39.

Monitoring for the presence of RF jacket 39 commences at block 337 when the communications unit RF transceiver 11 periodically transmits an interrogation signal to the RF jacket 39 on a receive frequency of RF jacket 39, wherein the RF jacket receive frequency is as defined below. This signal may be sent out, for example, every n seconds or every m minutes, depending upon the requirements of a specific system application. For purposes of illustration, each RF jacket 39 may be assigned one of a plurality of predetermined RF jacket receive frequencies within a given frequency band, and the communications unit RF transceiver 11 may be equipped to transmit an interrogation signal on any of these frequencies. Moreover, each RF jacket 39 may be assigned one of a plurality of predetermined RF jacket transmit frequencies within a given frequency band.

The communications unit RF transceiver 11 may be equipped to receive an RF jacket transmit frequency corresponding to a given RF jacket, immediately after the RF transceiver transmits on the RF jacket receive frequency of this RF jacket 39. If RF jacket transmit and/or receive frequencies are to be assigned, the fourth data field 509 (FIG. 7) includes an RF jacket 39 (FIG. 1) frequency specification that identifies the receive and/or transmit frequencies of RF jacket 39. The smart card reader/writer 15 forwards this frequency specification to the communications unit RF transceiver 11 so that the transceiver is able to transmit an interrogation signal on the receive frequency of a given RF jacket 39.

At block 339, a test is performed to ascertain whether or not the communications unit RF transceiver 11 has received an acknowledgment signal from the RF jacket 39 in response to an interrogation signal sent by communications unit RF transceiver. If the interrogation signal sent by the communications unit RF transceiver 11 is received by RF jacket 39, the RF jacket responds by transmitting an acknowledgment signal to the communications unit RF transceiver 11. In the present example, this acknowledgment signal is transmitted on the transmit frequency assigned to RF jacket 39. Receipt of the acknowledgment signal by the communications unit RF transceiver 11 signifies that the user has not left the vicinity of remote telephonic device 17. In this case, incoming telephone calls directed to home telephonic device 27 will continue to be forwarded to remote telephonic device 17, and program control loops back to block 337.

As the user leaves the vicinity of remote telephonic device 17, the RF communications link between communications unit RF transceiver 11 and RF jacket 39 weakens. Noise, interference, and fading increase. Meanwhile, the field strength of signals received at RF jacket 39 and communications unit RF transceiver 11 decreases until, at some point, the interrogation signal is too attenuated to be received by RF jacket 39, and/or the acknowledgment signal is too attenuated to be received by communications unit RF transceiver. If the communications unit RF transceiver 11 sends out an interrogation signal and receives no acknowledgment signal in response to this interrogation signal, the user is considered to have left the vicinity of remote telephonic device 17, and program control progresses to block 341 where the communications unit RF transceiver 11 sends an "out-of-radius" signal to microprocessor 13.

At block 343, upon receipt of the "out-of-radius" signal, microprocessor 13 starts a timer that has been initialized to a specified time interval. According to a first embodiment disclosed herein, call forwarding to remote telephonic device 17 is terminated after this timer expires. Pursuant to a second embodiment, call forwarding to remote telephonic device 17 is terminated immediately after microprocessor 13 receives an "out-of-radius" signal, but call forwarding to remote telephonic device 17 is resumed if the RF jacket 39 is once again detected in the vicinity of communications unit RF transceiver 11 before the timer expires. The first embodiment is set forth in blocks 441–457 of FIG. 4, whereas the second embodiment is set forth in blocks 741–757 of FIG. 5.

Figure 4:
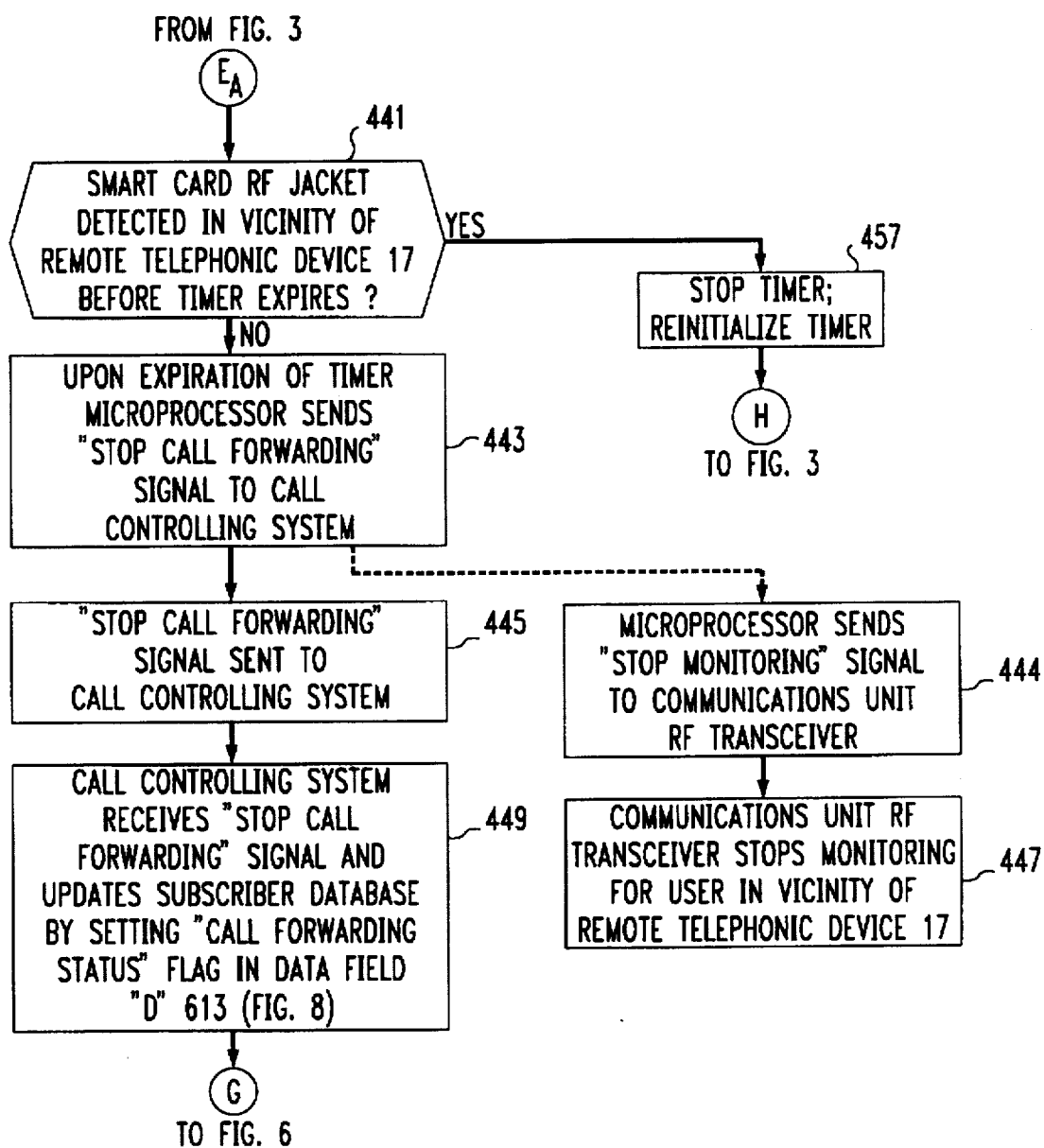

Pursuant to the first embodiment, program control progresses from block 343 (FIG. 3) to block 441 (FIG. 4). Once the specified time interval to which the timer was set elapses, incoming telephone calls for home telephonic device 27 will no longer be forwarded to remote telephonic device 17. However, while the timer is running, the communications unit RF transceiver 11 may continue to periodically send out interrogation signals (FIG. 4, block 441). If the communications unit RF transceiver 11 receives an acknowledgment signal in response to any of these interrogation signals, the timer is stopped and reinitialized (block 457), call forwarding is continued to the remote telephonic device 17, program control loops back to block 337 in FIG. 3.

If no acknowledgment signals are received in response to any of the interrogation signals sent out while the timer is running or, in other words, if the RF jacket is not detected in the vicinity of remote telephone device before the timer expires (block 441), then call forwarding is stopped once the timer expires. Upon expiration of the timer, the microprocessor 13 sends a "stop call forwarding" signal to: (a) call controlling system 23 (FIG. 1) at block 445 (FIG. 4), and also to (b) communications unit RF transceiver 11 (FIG. 1) at block 443 (FIG. 4). Concurrently with, prior to, or shortly after the performance of block 445, the communications unit RF transceiver 11 stops monitoring for the presence of the RF jacket 39 in the vicinity of the remote telephonic device (block 447).

At block 445, the "stop call forwarding" signal is sent from the microprocessor 13, via remote telephonic device 17, remote CO or PBX 19, and public or private network 21, to the call controlling system 23. The subscriber database in the call controlling system 23 is updated by setting the "call forwarding status" flag in data field "D" 613 (FIG. 8) to a value indicating that no call forwarding is to take place (FIG. 4, block 449). Program control then progresses to blocks 351–361 of FIG. 6, where the call controlling system 23 performs a test to ascertain whether or not the user has voice mail. The sequence of steps in blocks 351–361 (FIG. 6) is also performed immediately after the steps of the second embodiment set forth in FIG. 5.

Figure 5:
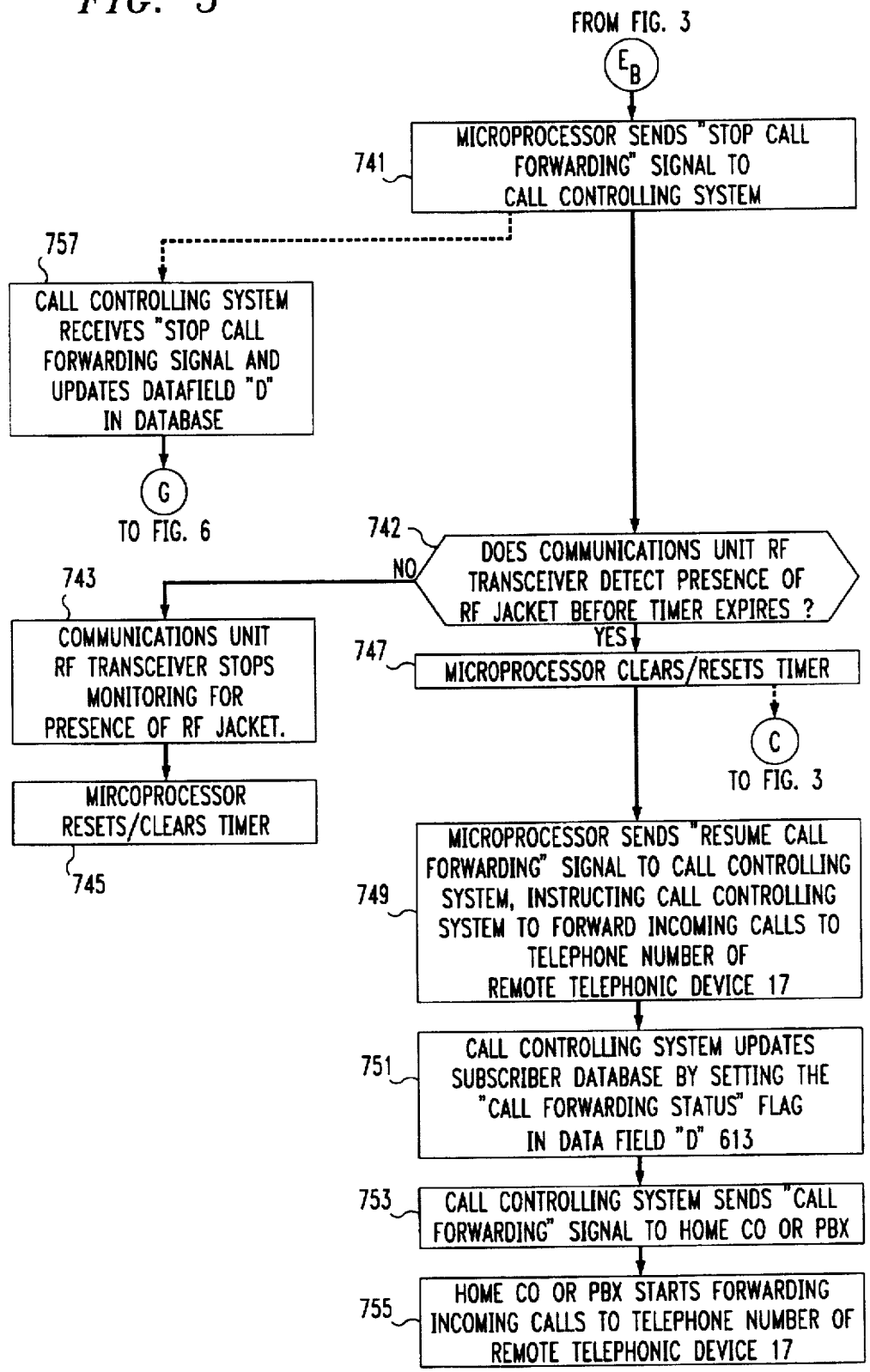

Pursuant to the second embodiment, program control progresses from block 343 (FIG. 3) to block 741 (FIG. 5). Block 741 may be performed shortly prior to, at approximately the same time, or shortly after the timer has been set at block 343. To stop call forwarding, the microprocessor 13 sends a "stop call forwarding" signal to call controlling system 23 via remote telephonic device 17, remote CO or PBX 19, and public or private network 21 (block 741). At block 757, the call controlling system receives the "stop call forwarding" signal and updates data field "D" 613 (FIG. 8) in the subscriber database 600 by setting the "call forwarding status" flag to a value indicative of the fact that call forwarding is not to take place. Then the program proceeds to block 351 of FIG. 6.

At the same time, or at about the same time, that the program proceeds to block 351 (FIG. 6), program control also progresses to block 742 (from block 741) where a test is performed by communications unit RF transceiver 11, under the control of microprocessor 13, to ascertain whether or not RF jacket 39 has been detected again in the vicinity of the communications unit RF transceiver 11 prior to expiration of the timer. If the RF jacket 39 has not been detected within the vicinity of the communications unit RF transceiver 11 prior to the expiration of the timer, program control progresses to block 743 where the microprocessor 13 instructs the communications unit RF transceiver 11 to stop sending out interrogation signals and, consequently, to stop monitoring for the presence of an RF jacket 39. At block 745, the timer is cleared and/or reset by microprocessor 13.

The affirmative branch from block 742, indicating that the communications unit RF transceiver 11 has detected the presence of RF jacket 39 (i.e., that the RF transceiver has received an acknowledgment signal in response to an interrogation signal transmitted by the RF transceiver), leads to block 747 where the timer is reset and/or cleared by microprocessor 13. After resetting the timer, program flow loops back to block 337 (FIG. 3). Microprocessor 13 and communications unit RF transceiver 11 continue to monitor for the presence of RF jacket 39 in the vicinity of the remote telephonic device by transmitting interrogation signals. At or about the same time that block 337 is performed, a "resume call forwarding" signal is sent from microprocessor 13 to call controlling system 23 (block 749) via remote telephonic device 17, remote CO or PBX 19, and public or private network 21. This signal instructs the call controlling system 23 to forward incoming telephone calls to the telephone number of remote telephonic device 17. The telephone number of remote telephonic device 17 is re-downloaded into data field "C" 611 (FIG. 8) at this time.

At block 751, the call controlling system updates the subscriber database 600 (FIG. 8) by setting the "call forwarding status" flag in data field "D" 613 to a value indicative of the fact that call forwarding is to take place. At block 753, the call controlling system 23 sends a "call forwarding" signal to the home CO or PBX 25 instructing the home CO or PBX to forward incoming telephone calls for the telephone number corresponding to home telephonic device 27, to the telephone number corresponding to remote telephonic device 17. The home CO or PBX 25 starts forwarding incoming telephone calls to the telephone number corresponding to remote telephonic device 17 at block 755.

Figure 6:
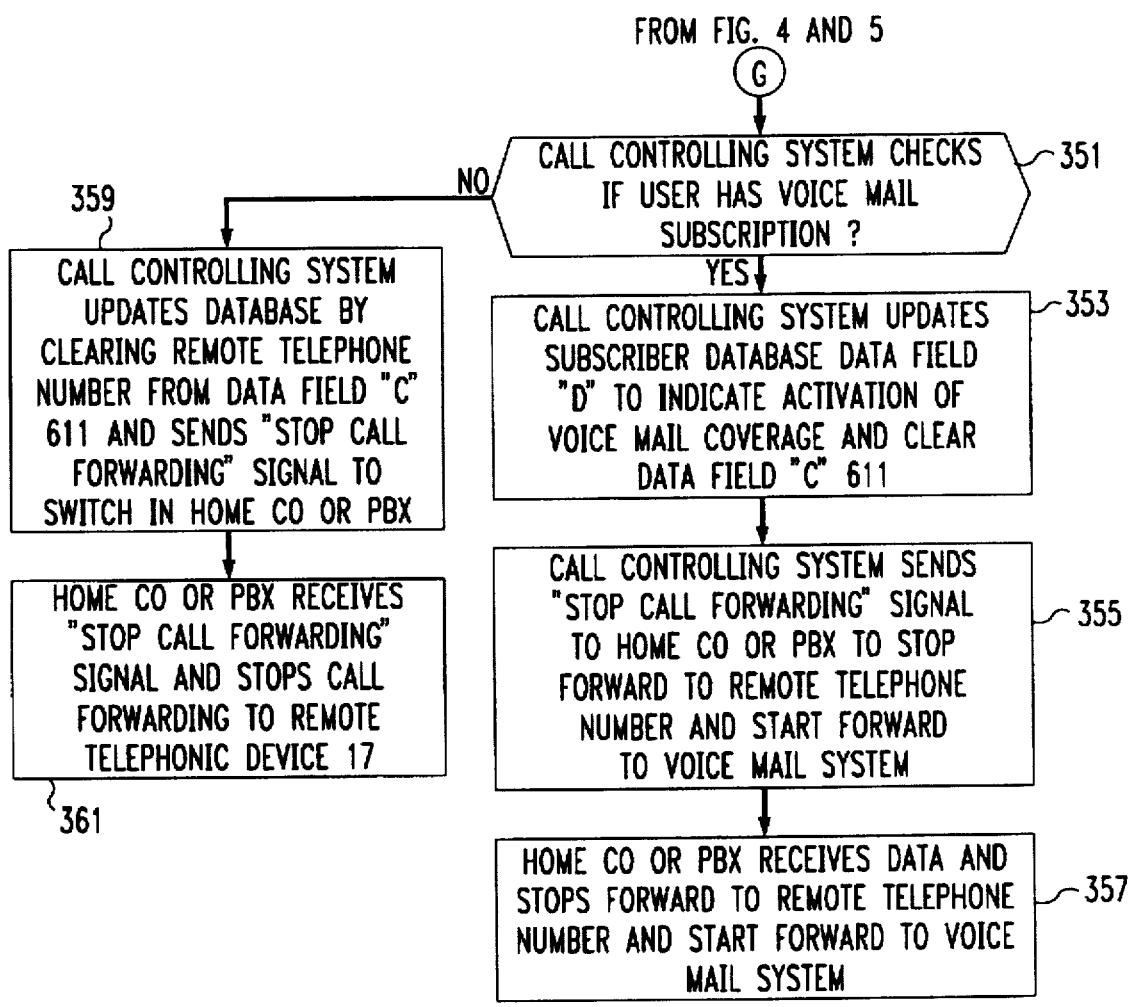

When program control progresses to block 351 of FIG. 6, the call controlling system 23 performs a test to ascertain whether or not the user has voice mail. This test may be performed, for example, by examining the user subscription information in data field "D" 613 (FIG. 8). In this case, the user subscription information includes an optional sub-field specifying whether or not a user has voice mail.

If the user does not have voice mail, program control progresses to block 359 where a "stop call forwarding" signal is sent from call controlling system 23 to a switch in home CO or PBX 25 corresponding to the home telephone number stored in data field "B" 609 (FIG. 8), and data field "C" 611 is cleared. Home CO or PBX 25 receives the "stop call forwarding" signal and stops call forwarding to remote telephonic device 17.

If the user has voice mail as determined at block 351, the program advances to block 353 where the subscriber database in call controlling system 23 is updated by (a) clearing data field "C" 611, and (b) by setting a "voice mail" flag in data field "D" 613 to a value indicative of the fact that calls are to be forwarded to a voice mail system. The call controlling system 23 then sends a "stop call forwarding" signal and a "forward calls to voice mail" signal to a switch in the home CO or PBX 25 corresponding to the home telephone number (block 355). The "stop call forwarding" signal instructs the home CO or PBX 25 to stop forwarding incoming calls to the remote telephonic device 17. The "forward calls to voice mail" signal instructs home CO or PBX 25 to start forwarding calls to voice mail. Home CO or PBX 25 starts forwarding calls to the voice mail system at block 357.

FIG. 8 is a data structure diagram setting forth an illustrative organizational scheme for the subscriber database of call controlling system 23. The subscriber database 600 includes a plurality of subscriber data blocks 601,603, 605. Each subscriber data block 601,603, 605 corresponds to a specific subscriber (user). Each data block 601,603,605 includes data field "A" 607, data field "B" 609, data field "C" 611, and data field "D" 613. Data field "A" 607 is employed to store a user identification number uniquely corresponding to a given subscriber. This user identification number is also stored on each subscriber's smart card 37.

Data field "B" 609 stores the home telephone number of the home telephonic device 27 corresponding to a given subscriber. In other words, the home telephone number is the telephone number assigned to this subscriber at the home CO or PBX 25. Data field "C" 611 is loaded with the telephone number of a remote telephonic device to which it is desired to forward incoming telephone calls. In other words, the remote telephone number is the telephone number at remote CO or PBX 19. Note that the contents of data field "C" 611 may change periodically as the subscriber changes locations, requiring calls to be forwarded to different remote CO's or PBXs 19, and/or to different telephone numbers assigned by the same remote CO or PBX 19.

Data field "D" includes user subscription information, including whether or not the user subscribes to a voice mail system, the telephone number of any such system, and whether or not the user subscribes to the call forwarding arrangement described herein. This field may also include a timer parameter, which is an optional parameter specifying how long a subscriber (i.e., an RF jacket 39) can remain out of range of communications unit RF transceiver 11 before incoming calls are no longer forwarded to the remote telephonic device 17 associated with this communications unit RF transceiver 11. An optional monitoring radius parameter is used to specify the monitoring range of communications unit RF transceiver 11. This parameter may specify the relative RF power output level to be transmitted by communications unit RF transceiver 11, and/or the minimum received signal strength level that communications unit RF transceiver 11 will use to detect an acknowledgment signal received from RF jacket 39. An automatic call forwarding feature flag is used to indicate whether or not a given telephone subscriber has subscribed to the call forwarding features described herein, and/or whether or not these call forwarding features have been activated or terminated. A voice mail flag is used to indicate if the subscriber has a voice mail subscription, and/or if such a subscription has been activated or terminated.

Call controlling system 23 (FIG. 1) has access to subscriber database 600 (FIG. 8), and this subscriber database 600 may reside, for example, on home CO or PBX 25. Alternatively, the subscriber database 600 can reside in a separate system that is selected independently of where the call controlling system 23 resides. For example, the subscriber database 600 may reside on one of the following systems: (1) a separate computer that interfaces with the user's home CO or PBX 25; (2) the public or private network 21; (3) microprocessor 13 (FIG. 1).

The improved automatic call forwarding techniques disclosed herein may forward incoming calls that are voice calls, calls generated by facsimile (fax) machines to deliver faxes, calls generated by video conferencing/teleconferencing systems, and calls generated by messaging systems to deliver message notifications. In the context of the above-described call forwarding techniques, when a user places a smart card 37 into smart card reader/writer 15, the call controlling system 23 can send signals to one or more additional communications devices, such as the subscriber's home CO or PBX 25, the subscriber's voice mail system 26, the subscriber's telephone answering machine, and/or the subscriber's fax machine, to thereby activate multiple call forwarding.

Some existing voice mail systems 26 (FIG. 1) provide a message notification scheme which is commonly referred to as an outcalling feature. This outcalling feature allows the subscriber to pre-program an arbitrarily-selected telephone number as the "outcalling telephone number" in voice mail system 26 via a touch-tone keypad on a telephonic device (i.e., home telephonic device 17). When the voice mail system 26 receives an incoming message for this subscriber, the voice mail system 26 will "outcall" by initiating an outgoing telephone call to the outcalling telephone number. Upon answering the outcall at the outcalling telephone number, the voice mail system 26 may provide the subscriber with a voice message (voice announcement) that notifies the subscriber of the existence of one or more incoming messages. The voice mail system 26 may then provide the subscriber with the option of logging into voice mail system 26 and retrieving incoming messages.

The above-described improved call forwarding techniques using smart cards may be advantageously employed in the context of the outcalling feature. For example, one or more outcalling telephone numbers are stored on a subscriber's smart card 37, providing the subscriber with the option of setting and/or changing the outcalling telephone number by placing smart card 37 into a smart card reader/writer 15. In this manner, the subscriber is no longer required to manually dial a touch-tone-equipped telephonic device in order to access voice mail system 26, and then manually enter the outcalling telephone number or numbers into the touch-tone keypad. Furthermore, when the subscriber leaves the vicinity of remote telephonic device 17, outcalling may be automatically redirected back to home telephonic device 27. As an optional feature, voice mail system 26 may be programmed such that, if the outcalling telephone number is identical to the telephone number of home telephonic device 27, then the voice mail system 26 may use alternative message notification methods such as, for example, illuminating a message indication lamp or providing a stutter dial tone.

FIGS. 9, 10, 11, and 12 together comprise a software flowchart setting forth an operational sequence for implementing automatic call forwarding of message notification calls using the system of FIG. 1. These flowcharts describe an optional message notification call redirection feature, hereinafter referred to as the automatically forwarded outcalling feature. In order to apply the improved smart card call forwarding techniques disclosed herein to the outcalling feature in an efficient manner, call controlling system 23 may reside on voice mail system 26 (FIG. 1 ). An automatically forwarded outcalling feature flag is incorporated into data field "D" 613 (FIG. 8) that has a value indicative of whether or not the automatically forwarded outcalling feature is to be performed. The value of the automatically forwarded outcalling feature flag in data field "D" 613 may change as the sequence of operations in FIGS. 9-12 are performed. Fourth data field 509 (FIG. 7) stored in smart card 37 (FIG. 1) contains a smart card outcalling flag indicative of whether or not a given user has subscribed to the automatically forwarded outcalling feature. This outcalling flag may also be stored in the subscriber database 600. The value of the smart card outcalling flag in fourth data field 509 generally remains the same as the operations of FIGS. 9-12 are performed, because this flag is merely indicative as to whether the user has subscribed to the outcalling feature. By contrast, the automatically forwarded outcalling feature flag in data field "D" 613 specifies whether or not the feature is to be performed during various steps in FIGS. 9-12.

The program commences at block 921, where a smart card 37 that has been placed into the smart card reader/writer 15 (FIG. 1) is read. A smart card 37 and an associated RF jacket 39 are assigned to a specific system user that uses a corresponding home telephonic device 27. If this user is located near remote telephonic device 17 and desires to have incoming message notification calls redirected from home telephonic device 27 to remote telephonic device 17, the user removes smart card 37 from RF jacket 39 and places smart card 37 into the smart card reader/writer 15 to initiate the telephone call message notification redirection procedure. However, note that the RF jacket 39 could, alternatively, be configured so as to permit smart card reader/writer 15 to perform read/write operations on smart card 37 while the smart card 37 is encased in RF jacket 39.

Figure 9:
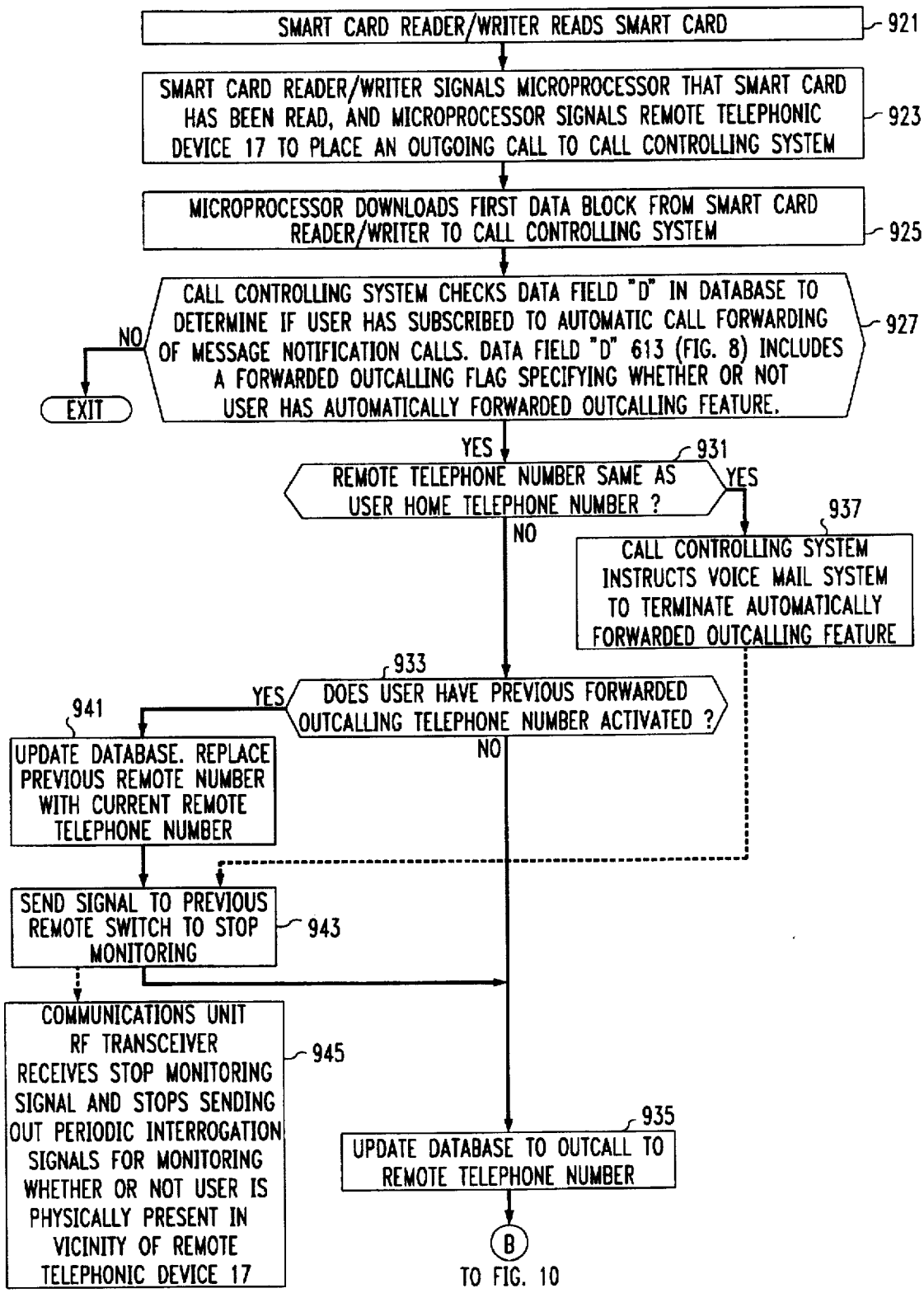
FIGS. 9, 10, 11, and 12 together comprise a software flowchart setting forth an operational sequence for implementing automatic call forwarding of message notification calls using the system of FIG. 1.

At block 923, the smart card reader/writer 15 signals microprocessor 13 that a smart card has been read, and microprocessor signals remote telephonic device 17 to place an outgoing call to call controlling system with subscriber database 23 via public or private network 21 and remote CO or PBX 19. When the outgoing call is answered by the call controlling system with subscriber database 23 (hereinafter, call controlling system 23), the microprocessor 13 downloads a first data block 501 (FIG. 7) from the smart card reader/writer 15 to the call controlling system 23 (FIG. 9, block 925). This first data block 501 (FIG. 7) includes a first data field 503 uniquely identifying the user (i.e., specifying a user ID), a second data field 505 specifying the home telephone number of the home telephonic device 27 (FIG. 1), a third data field 507 (FIG. 7) specifying the telephone number of the remote telephonic device 17 (FIG. 1), and a fourth data field 509 (FIG. 7) including the smart card outcalling flag specifying whether or not the user has subscribed to the message notification call redirection feature described herein. However, before microprocessor 13 downloads data block 501 to call controlling system 23, microprocessor 13 writes the remote telephone number corresponding to remote telephonic device 17 into the third data field 507 of the first data block 501. Microprocessor 13 also writes the remote telephone number corresponding to remote telephonic device 17 into the third data field 507 of smart card 37 via smart card reader/writer 15, while smart card 37 is coupled to smart card reader/writer 15.

At block 927 (FIG. 9), after receiving the data from the microprocessor 13, the call controlling system 23 checks data field "D" 613 (FIG. 8) corresponding to the specified user ID to determine whether or not the user has subscribed to the automatically forwarded outcalling feature. If the user has not subscribed to the automatically forwarded outcalling feature, the program exits. If the user has subscribed to the automatically forwarded outcalling feature, the program progresses to block 931 (FIG. 9) where the call controlling system performs a test to ascertain whether or not the home telephone number stored in data field "B" 609 (FIG. 8) is identical to the remote telephone number stored in third data field 507 (FIG. 7). If so, the program progresses to block 937 (FIG. 9), where the call controlling system 23 updates the subscriber database 600 (FIG. 8) by removing the remote telephone number and changing the automatically forwarded outcalling feature flag in data field "D" 613 (FIG. 8) to a value indicative that the automatically forwarded outcalling feature is not to take place, i.e., that the automatically forwarded outcalling feature has been terminated. The automatically forwarded outcalling feature flag can be implemented using a single bit, such that a first bit value, i.e., "1", indicates that the flag is set and automatic forwarding of message notification calls is to take place, and such that a second bit value, i.e., "0", indicates that the flag is not set and no automatic forwarding of message notification calls will take place.

At block 937, the call controlling system 23 sends a forwarded outcalling termination signal to voice mail system 26 instructing the voice mail system 26 to terminate automatically-forwarded outcalling for the corresponding specified user. Therefore, message notification calls directed to the telephone number corresponding to home telephonic device 27 will no longer be automatically forwarded. This forwarded outcalling termination signal includes the user ID and the subscriber home telephone number corresponding to home telephonic device 27. In response to the forwarded outcalling termination signal received from call controlling system 23, voice mail system 26 terminates forwarded outcalling to the remote telephone number corresponding to remote telephonic device 17, and subsequent outcalls (i.e., message notification calls) are directed to the home telephone number corresponding to home telephonic device 27 (block 937). The call controlling system 23 sends a "termination of monitoring" flag to the communications unit RF transceiver 11 associated with remote telephonic device 17, instructing this RF transceiver to no longer monitor RF jacket 39, i.e., to no longer transmit interrogation signals to the RF jacket (block 943). The "termination of monitoring" flag can be implemented using a single bit, such that a first bit value, i.e., "1", indicates that the flag is set and monitoring is to terminate, and such that a second bit value, i.e., "0", indicates that the flag is not set and monitoring may continue.

The negative branch from block 931 leads to block 933, where a test is performed to ascertain whether or not the automatically forwarded outcalling feature is already being performed. In other words, has the user previously activated the automatically forwarded outcalling feature, and is this previous activation still active? This test can be performed by comparing the smart card third data field 507 (FIG. 7) with data field "C" 611 (FIG. 8) in the subscriber database 600 (FIG. 8) of call controlling system 23 (FIG. 1 ). If the contents of the third data field 507 are different from the contents of data field "C" 611, then the user has previously activated the automatically forwarded outcalling feature. The affirmative branch from block 933 leads to block 941, where the subscriber database in call controlling system 23 is updated by replacing the previous remote telephone number in data field "C" 611 (FIG. 8) with the current remote telephone number from third data field 507 (FIG. 7). At block 943, a "stop monitoring" signal is sent to remote CO or PBX 19 that corresponds to the previous remote telephone number in data field "C" 611 (FIG. 8). The "stop monitoring" signal includes the user ID, the previous remote telephone number, and a "termination of monitoring" flag specifying termination of monitoring at the previous remote telephone number. This "stop monitoring" instruction is sent to communications unit RF transceiver 11 via remote telephonic device 17 and microprocessor 13 (block 945). The "stop monitoring" signal commands the communications unit RF transceiver 11 to stop transmitting periodic interrogation signals. These signals are sent out to monitor whether or not the user is physically present in the vicinity of remote telephonic device, as will be described in greater detail below with reference to FIG. 10, block 1037.

After sending the "stop monitoring" signal to the previous remote switch at block 943, the call controlling system 23 proceeds to block 935. The dashed program flow line from block 943 to block 945 signifies that the operations of block 945 are performed concurrently with, immediately prior to, or immediately after, the operations of block 935 are performed.

The negative branch from block 933, signifying that the automatically forwarded outcalling feature is not currently activated for the user, leads to block 935. At block 935, the subscriber database stored in call controlling system 23 is updated when microprocessor 13 downloads the remote telephone number from the third data field 507 (FIG. 7) into the subscriber database data field "C" 611 (FIG. 8) via remote telephonic device 17, remote CO or PBX 19, and public or private network 21. The automatically forwarded outcalling feature flag in data field "D" 613 (FIG. 8) is also set to a value indicating that the automatically forwarded outcalling feature is to be performed.

Figure 10:
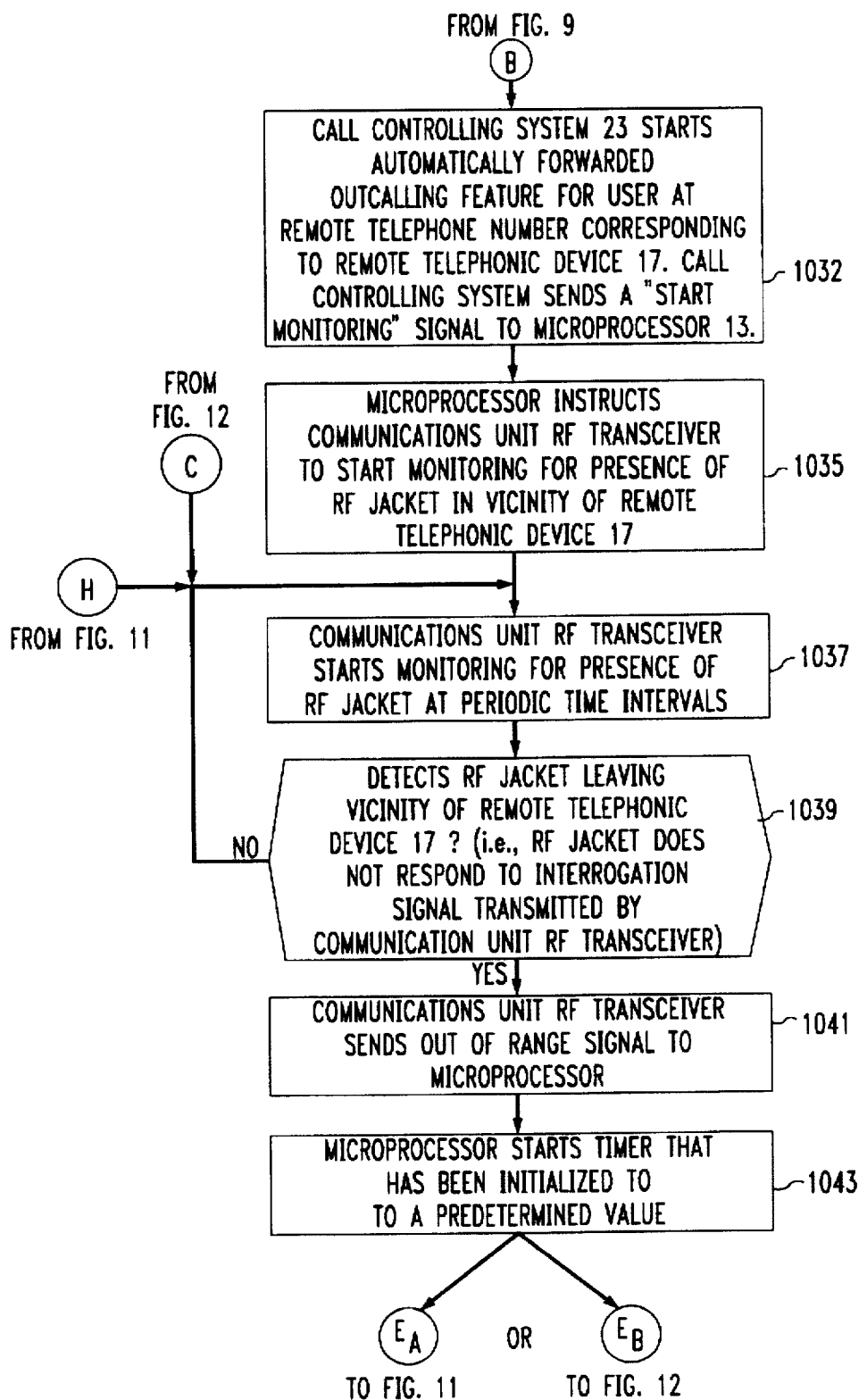

Program control then progresses to block 1032 of FIG. 10, where the call controlling system 23 (FIG. 1) starts the automatically forwarded outcalling feature for the user at the remote telephone number corresponding to remote telephonic device 27. The call controlling system 23 sends a "start monitoring" signal to the microprocessor 13, causing the microprocessor 13 to instruct the communications unit RF transceiver 11 to transmit interrogation signals, and also causing the communications unit RF transceiver 11 to detect any acknowledgment signals received in response to any transmitted interrogation signal.

Call controlling system 23 sends a "start monitoring" signal to microprocessor 13 at the new remote CO or PBX 19 to start monitoring the RF jacket 39 at block 1032. The "start monitoring" signal includes the user ID, the remote telephone number, an optional range of monitoring parameter, and an optional timer parameter. The functions of the timer parameter and the range of monitoring parameter will be described in greater detail hereinafter. This "start monitoring" instruction is sent to communications unit RF transceiver 11 via remote telephonic device 17 and microprocessor 13 (block 1035). The "start monitoring" signal commands the communications unit RF transceiver 11 to start transmitting periodic interrogation signals. These signals are sent out to monitor whether or not the user is physically present in the vicinity of remote telephonic device 17.

To summarize the operations of block 1035, the microprocessor 13 (FIG. 1) instructs the communications unit RF transceiver 11 to start monitoring for the presence of the RF jacket 39 in the vicinity of remote telephonic device 17. During typical system operation, it is generally expected that the user will retain RF jacket 39 and smart card 37 on his or her person, with the smart card 37 inserted into the RF jacket 39. Therefore, monitoring for the presence of the RF jacket 39 is conducted for the purpose of ascertaining whether or not the user has left the vicinity of remote telephonic device 17 and, therefore, whether message notification calls for this user should still be forwarded to this remote telephonic device 17. If the user has left the vicinity of the remote telephonic device for more than a specified amount of time, it is assumed that message notification calls for this user are no longer to be forwarded to remote telephone device 17. By contrast, if the user remains in the vicinity of remote telephonic device 17, it is assumed that message notification calls should continue to be forwarded to remote telephonic device 17. The length of this specified amount of time may be ascertained by assigning an appropriate value to the optional timer parameter discussed above. The "range of monitoring" parameter is optionally used to set (a) the RF power output level of communications unit RF transceiver 11, and/or (b) the minimum received signal strength that communications unit RF transceiver 11 will use to accept an incoming acknowledgment signal sent by an RF jacket 39.

Monitoring for the presence of RF jacket 39 commences at block 1037 when the communications unit RF transceiver 11 periodically transmits an interrogation signal to the RF jacket 39 on a receive frequency of RF jacket 39, wherein the RF jacket receive frequency is as defined below. This signal may be sent out, for example, every n seconds or every m minutes, depending upon the requirements of a specific system application. For purposes of illustration, each RF jacket 39 may be assigned one of a plurality of predetermined RF jacket receive frequencies within a given frequency band, and the communications unit RF transceiver 11 may be equipped to transmit an interrogation signal on any of these frequencies. Moreover, each RF jacket 39 may be assigned one of a plurality of predetermined RF jacket transmit frequencies within a given frequency band.

The communications unit RF transceiver 11 may be equipped to receive an RF jacket transmit frequency corresponding to a given RF jacket, immediately after the RF transceiver transmits on the RF jacket receive frequency of this RF jacket 39. If RF jacket transmit and/or receive frequencies are to be assigned, the fourth data field 509 (FIG. 7) includes an RF jacket 39 (FIG. 1) frequency specification that identifies the receive and/or transmit frequencies of RF jacket 39. The smart card reader/writer 15 forwards this frequency specification to the communications unit RF transceiver 11 so that the transceiver is able to transmit an interrogation signal on the receive frequency of a given RF jacket 39.

At block 1039, a test is performed to ascertain whether or not the communications unit RF transceiver 11 has received an acknowledgment signal from the RF jacket 39 in response to an interrogation signal sent by communications unit RF transceiver. If the interrogation signal sent by the communications unit RF transceiver 11 is received by RF jacket 39, the RF jacket responds by transmitting an acknowledgment signal to the communications unit RF transceiver 11. In the present example, this acknowledgment signal is transmitted on the transmit frequency assigned to RF jacket 39. Receipt of the acknowledgment signal by the communications unit RF transceiver 11 signifies that the user has not left the vicinity of remote telephonic device 17. In this case, message notification calls will continue to be forwarded to remote telephonic device 17, and program control loops back to block 1037.

As the user leaves the vicinity of remote telephonic device 17, the RF communications link between communications unit RF transceiver 11 and RF jacket 39 weakens. Noise, interference, and fading increase. Meanwhile, the field strength of signals received at RF jacket 39 and communications unit RF transceiver 11 decreases until, at some point, the interrogation signal is too attenuated to be received by RF jacket 39, and/or the acknowledgment signal is too attenuated to be received by communications unit RF transceiver. If the communications unit RF transceiver 11 sends out an interrogation signal and receives no acknowledgment signal in response to this interrogation signal, the user is considered to have left the vicinity of remote telephonic device 17, and program control progresses to block 1041 where the communications unit RF transceiver 11 sends an "out-of-range" signal to microprocessor 13.

At block 1043, upon receipt of the "out-of-radius" signal, microprocessor 13 starts a timer that has been initialized to a specified time interval. According to a first embodiment disclosed herein, automatically forwarded outcalling to remote telephonic device 17 is terminated after this timer expires. Pursuant to a second embodiment, automatically forwarded outcalling to remote telephonic device 17 is terminated immediately after microprocessor 13 receives an "out-of-range" signal, but automatically forwarded outcalling to remote telephonic device 17 is resumed if the RF jacket 39 is once again detected in the vicinity of communications unit RF transceiver 11 before the timer expires. The first embodiment is set forth in blocks 1141–1157 of FIG. 11, whereas the second embodiment is set forth in blocks 1241–1257 of FIG. 12.

Figure 11:
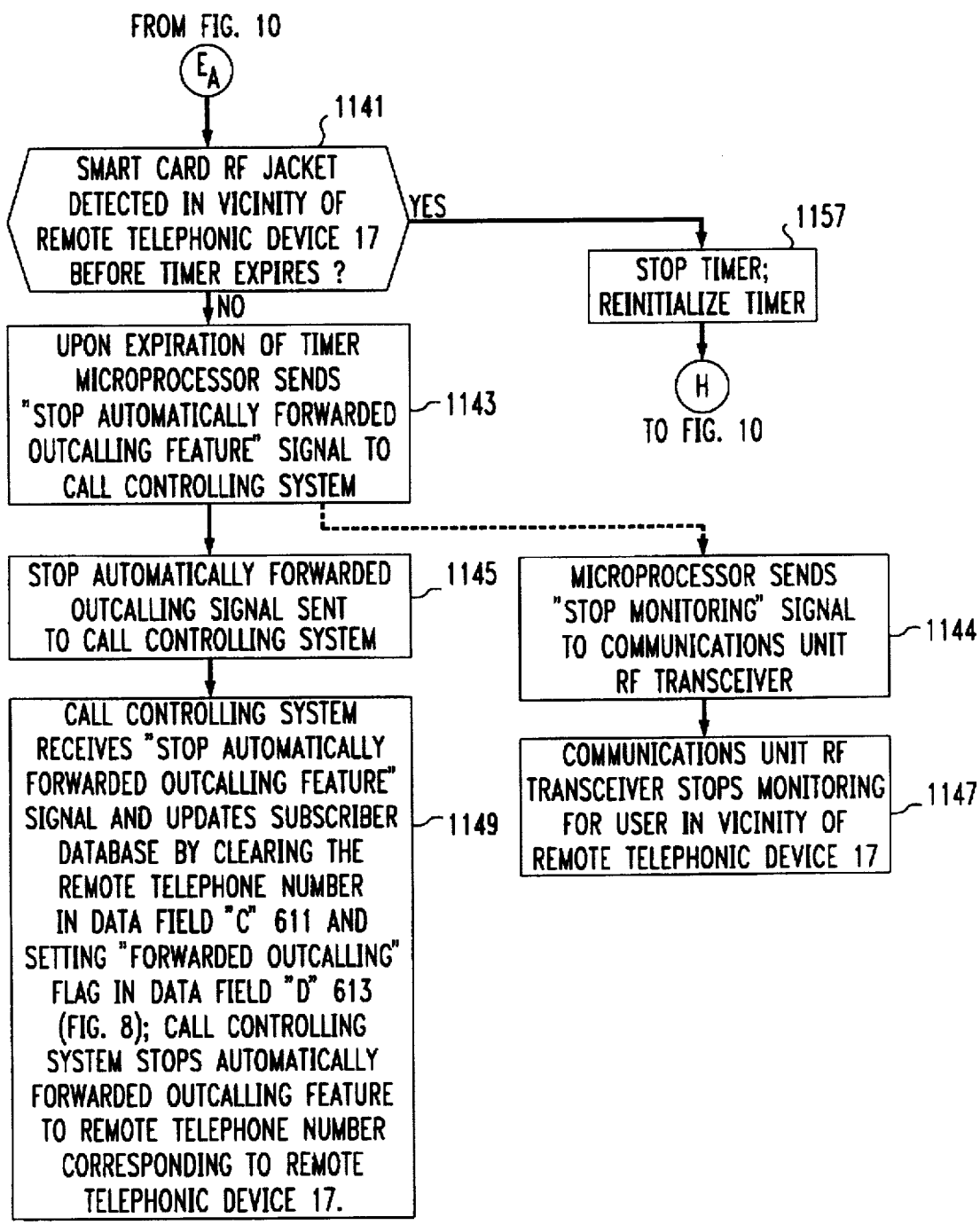

Pursuant to the first embodiment, program control progresses from block 1043 (FIG. 10) to block 1141 (FIG. 11). Once the specified time interval to which the timer was set elapses, message notification calls will no longer be forwarded to remote telephonic device 17. However, while the timer is running, the communications unit RF transceiver 11 may continue to periodically send out interrogation signals (FIG. 11, block 1141). If the communications unit RF transceiver 11 receives an acknowledgment signal in response to any of these interrogation signals, the timer is stopped and reinitialized (block 1157), automatically forwarded outcalling is continued to the remote telephonic device 17, program control loops back to block 1037 in FIG. 10.

If no acknowledgment signals are received in response to any of the interrogation signals sent out while the timer is running or, in other words, if the RF jacket is not detected in the vicinity of remote telephone device before the timer expires (block 1141), then automatically forwarded outcalling is stopped once the timer expires. Upon expiration of the timer, the microprocessor 13 sends a "stop automatically forwarded outcalling" signal to: (a) call controlling system 23 (FIG. 1) at block 1145 (FIG. 11), and also to (b) communications unit RF transceiver 11 (FIG. 1) at block 1143 (FIG. 11). Concurrently with, prior to, or shortly after the performance of block 1145, the communications unit RF transceiver 11 stops monitoring for the presence of the RF jacket 39 in the vicinity of the remote telephonic device (block 1147).

At block 1145, the "stop automatically forwarded outcalling" signal is sent from the microprocessor 13, via remote telephonic device 17, remote CO or PBX 19, and public or private network 21, to the call controlling system 23. The subscriber database in the call controlling system 23 is updated by (a) clearing the telephone number corresponding to remote telephonic device 17 from data field "C" 611 (FIG. 8) and by (b) setting the automatically forwarded outcalling feature flag in data field "D" 613 (FIG. 8) to a value indicating that no automatically forwarded outcalling is to take place (FIG. 11, block 1149).

Figure 12:
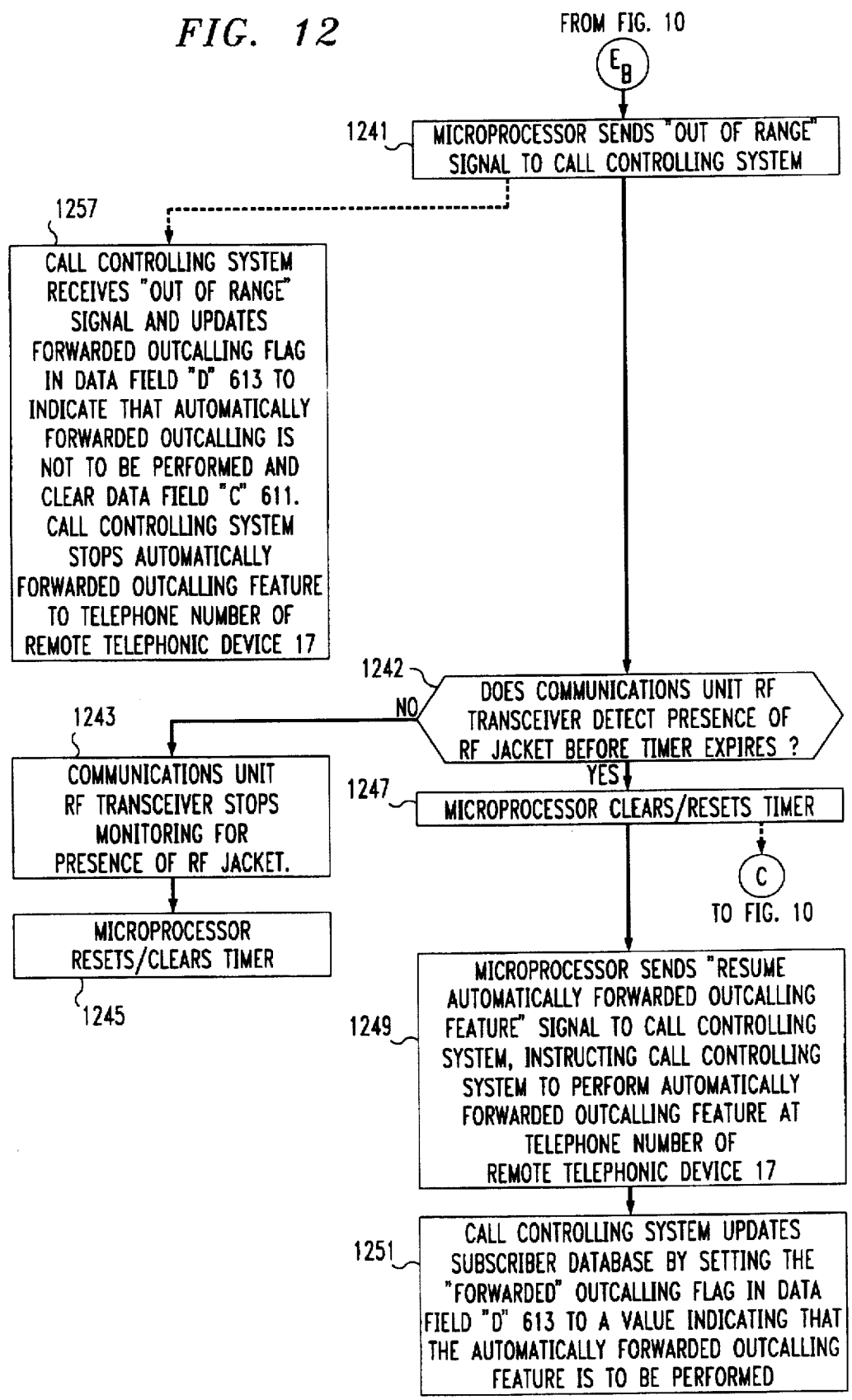

Pursuant to the second embodiment, program control progresses from block 1043 (FIG. 10) to block 1241 (FIG. 12). Block 1241 may be performed shortly prior to, at approximately the same time, or shortly after the timer has been set at block 1043. To stop outcalling, the microprocessor 13 sends an "out of range" signal to call controlling system 23 via remote telephonic device 17, remote CO or PBX 19, and public or private network 21 (block 1241). At block 1257, the call controlling system receives the "out of range" signal, updates data field "D" 613 (FIG. 8) in the subscriber database 600 by setting the automatically forwarded outcalling feature flag to a value indicative of the fact that automatically forwarded outcalling is not to take place, and clears data field "C" 611. The call controlling system 23 stops automatically forwarded outcalling to the telephone number corresponding to remote telephonic device 17.

Program control progresses from block 1241 to block 1242, where a test is performed by communications unit RF transceiver 11, under the control of microprocessor 13, to ascertain whether or not RF jacket 39 has been detected again in the vicinity of the communications unit RF transceiver 11 prior to expiration of the timer. If the RF jacket 39 has not been detected within the vicinity of the communications unit RF transceiver 11 prior to the expiration of the timer, program control progresses to block 1143 where the microprocessor 13 instructs the communications unit RF transceiver 11 to stop sending out interrogation signals and, consequently, to stop monitoring for the presence of an RF jacket 39. At block 1245, the timer is cleared and/or reset by microprocessor 13.

The affirmative branch from block 1242, indicating that the communications unit RF transceiver 11 has detected the presence of RF jacket 39 (i.e., that the RF transceiver has received an acknowledgment signal in response to an interrogation signal transmitted by the RF transceiver), leads to block 1247 where the timer is reset and/or cleared by microprocessor 13. After resetting the timer, program flow loops back to block 1037 (FIG. 10). Microprocessor 13 and communications unit RF transceiver 11 continue to monitor for the presence of RF jacket 39 in the vicinity of the remote telephonic device by transmitting interrogation signals. At or about the same time that block 1037 is performed, a "resume automatically forwarded outcalling" signal is sent from microprocessor 13 to call controlling system 23 (block 1149) via remote telephonic device 17, remote CO or PBX 19, and public or private network 21. This signal instructs the call controlling system 23 to forward message notification calls for home telephonic device 27 to the telephone number of remote telephonic device 17. The telephone number corresponding to remote telephonic device 17 (i.e., the remote telephone number) is re-downloaded into data field "C" 611 (FIG. 8). At block 1251, the call controlling system updates the subscriber database 600 (FIG. 6) by setting the automatically forwarded outcalling feature flag in data field "D" 613 to a value indicative of the fact that automatically forwarded outcalling is to take place.

The invention claimed is:

1. An automatic call forwarding apparatus for use in conjunction with a telephonic communications system, the apparatus comprising:

(a) a telephonic device coupled to a microprocessor;

(b) a smart card reader/writer coupled to the telephonic device and equipped to read a subscriber telephone number from a smart card;

(c) a communications unit RF transceiver coupled to the telephonic device;

(d) a smart card for storing a subscriber telephone number;

(e) and an RF jacket transceiver adapted to partially and removably encase the smart card and to read a subscriber telephone number from a smart card;

wherein, in response to (i) receipt of the subscriber telephone number from the smart card reader/writer and (ii) establishment of communications between the RF jacket transceiver and the communications unit RF transceiver, the microprocessor instructs the communications system to forward incoming telephone calls for the subscriber telephone number to the telephonic device; and the microprocessor instructs the communications system to cancel forwarding of incoming telephone calls in response to lack of establishment of communications between the RF jacket transceiver and the communications unit RF transceiver.

2. The automatic call forwarding apparatus of claim 1 wherein the communications unit RF transceiver periodically transmits an interrogation signal to the RF jacket transceiver.

3. The automatic call forwarding apparatus of claim 2 wherein, if the interrogation signal is received by the RF jacket transceiver, the RF jacket transceiver sends an acknowledgment signal to the communications unit RF transceiver.

4. The automatic call forwarding apparatus of claim 3 wherein, upon receipt of the acknowledgment signal at the communications unit RF transceiver, incoming calls for the subscriber telephone number will continue to be forwarded to the telephonic device.

5. The automatic call forwarding apparatus of claim 4 wherein, if the interrogation signal is not received by the RF jacket transceiver, the RF jacket transceiver fails to transmit an acknowledgment signal, and the communications unit RF transceiver, in response to the receipt of no acknowledgment signal, causes the microprocessor to instruct the communications system to cease forwarding incoming calls for the subscriber telephone number to the telephonic device.

6. The automatic call forwarding apparatus of claim 5 wherein the communications unit transceiver, in response to the receipt of no acknowledgment signal, waits for a predetermined time interval before causing the microprocessor to instruct the communications system to cease forwarding incoming calls for the subscriber telephone number to the telephonic device.

7. The automatic call forwarding apparatus of claim 5 wherein the communications unit transceiver, in response to the receipt of no acknowledgment signal, causes the microprocessor to instruct the communications system to cease forwarding incoming calls for the subscriber telephone number to the telephonic device, but if the communications unit transceiver receives an acknowledgment signal in response to an interrogation signal within a predetermined time interval after the communications unit ceases forwarding incoming calls, the communications system resumes forwarding incoming calls for the subscriber telephone number to the telephonic device.

8. An automatic call forwarding apparatus for use in conjunction with a telephonic communications system, the apparatus comprising:

(a) a telephonic device coupled to a microprocessor and adapted for coupling to the telephonic communications system;

(b) a smart card reader/writer coupled to the telephonic device;

(c) a communications unit RF transceiver coupled to the telephonic device;

(d) a smart card for storing a subscriber telephone number;

(e) an RF jacket transceiver adapted to partially and removably encase the smart card and to read a subscriber telephone number from a smart card; and (f) a voice mail system equipped to place an outgoing message notification telephone call to an outcalling telephone number in response to the receipt of an incoming voice mail message; the voice mail system being adapted for coupling to the telephonic communications system;

wherein, in response to input received from the smart card reader/writer, the microprocessor instructs the voice mail system to forward outgoing message notification telephone calls to the telephonic device upon establishment of communications between the communications unit RF transceiver and the RF jacket transceiver, and the microprocessor instructs the voice mail system to cancel forwarding of outgoing message notification telephone calls upon lack of establishment of communications between the RF jacket transceiver and the communications unit RF transceiver.

* * * * *